United States Patent [19]
Fukutome et al.

[11] Patent Number: 5,850,306
[45] Date of Patent: Dec. 15, 1998

[54] OPTICAL SCANNER

[75] Inventors: Yasuyuki Fukutome, Tokyo; Takashi Shiraishi, Kanagawa-ken; Masao Yamaguchi, Chiba-ken, all of Japan

[73] Assignee: Kabushiki Kaisha Toshiba, Japan

[21] Appl. No.: 772,931

[22] Filed: Dec. 23, 1996

[30] Foreign Application Priority Data

Dec. 26, 1995 [JP] Japan .................................... 7-339225

[51] Int. Cl.$^6$ ..................................................... G02B 26/08
[52] U.S. Cl. ........................... 359/204; 359/206; 359/216; 347/242; 347/243; 347/244
[58] Field of Search .................... 359/204–206, 359/212–219, 811, 819, 818, 662; 347/129, 130, 134, 137, 138–140, 232, 233, 241–245

[56] References Cited

U.S. PATENT DOCUMENTS 4,731,623  3/1988  Oda et al. ................................ 359/216
5,181,137  1/1993  Koide ...................................... 359/206

*Primary Examiner*—James Phan
*Attorney, Agent, or Firm*—Limbach & Limbach L.L.P.

[57] ABSTRACT

An optical scanner includes an optical deflector having a plurality of reflecting surfaces to deflect laser beams emitted from light sources, an f θ lens to through which the laser beams pass for correcting fluctuation of laser beams caused by the plural uneven reflecting surfaces of the optical deflector, a first mirror provided at a first side to the optical axis of the f θ lens to reflect laser beams passed through the f θ lens, and a second mirror provided at a second side opposite to the first side to the optical axis of the f θ lens to reflect the laser beams reflected by the first mirror and lead the laser beams to photosensitive drums arranged at the second side. Further, the optical scanner includes a fixing member provided at the first side to hold the f θ lens and a presser blade spring provided at a position closer to the optical axis of the f θ lens than the second mirror at the second side to press the f θ lens against the fixing member.

6 Claims, 13 Drawing Sheets

OPTICAL SCANNER

BACKGROUND OF THE INVENTION

1. Field of the Invention

The present invention relates to a multi-beam optical scanner utilized in image forming apparatuses such as high-speed laser printers, color copying machines using a plurality of photosensitive drums or digital color copying machines.

2. Description of the Related Art

On an image forming apparatus such as, for instance, a color printer or a color copying machine using a plurality of photosensitive drums, a plurality of image forming units corresponding to decomposed color components are provided. For this image forming units, a laser exposing device, that is, an optical scanner is used to provide image data corresponding to color components, that is, a plurality of laser beams.

In general, an optical scanner has semiconductor laser beam devices as light sources, a first lens group to narrow a diameter of laser beams emitted from laser beam devices to a prescribed size, an optical deflector to continuously reflect the laser beams narrowed by the first lens group in the direction orthogonal to the direction in which a recording medium is conveyed, a second lens group to focus the laser beams deflected by the optical deflector into an image at a prescribed position on a recording medium and the like.

In case of this type of image forming apparatus, two kinds of examples are known; one is an example wherein a plurality of optical scanners are arranged corresponding to respective image forming units and the other is an example wherein a multi-beam scanner capable of providing a plurality of laser beams is arranged.

As a multi-beam optical scanner, an example utilizing 4 sets of laser elements and lens groups and 2 sets of optical deflectors is proposed to provide 4 laser beams as disclosed in the Japanese Publication of Unexamined Patent Application No. 5-83485.

Separately from this, another example is also proposed, wherein 2 groups of f θ lenses are provided, of which only one set is a first f θ lens group provided near the optical deflector, all laser beams deflected by the deflector are applied, while the number of lenses corresponding to all laser beams are provided to a second f θ lens group positioned away from the optical deflector. That is, in this example, to provide 4 laser beams, 4 sets are used for the second f θ lens group.

Further, in Japanese Publication of Unexamined Patent Application No. 1-75239, a method to apply all laser beams to the same f θ lens group by providing only one set of a f θ lens group is disclosed.

In addition, in the Japanese Publication of Unexamined Patent Application No. 5-34612, a method is disclosed, which is to guide 4 laser beams to the optical deflector by superposing 4 laser beams in order utilizing plural half mirrors so that they can be recognized substantially to be a single laser beam.

By the way, when the multi-beam optical scanner disclosed in the Japanese Publication of Unexamined Patent Application No. 5-83485 is used, a size of a space occupied by the optical scanner is largely reduced when compared with a case wherein plural optical scanners are used. However, as a single unit of optical scanner, costs of component parts resulting from increase in the number of lens and/or mirrors and assembling increase and a size and weight of a single unit of optical scanner increases.

On the other hand, in an example disclosed in the Japanese Publication of Unexamined Patent Application No. 5-34612, intensity (quantity) of laser beams passing through most many half mirrors must be secured sufficiently and as a result, a light source will become large. Further, this type of optical scanner has such a problem that an optical system at the later stage of the scanner for separating laser beams scanned by one scanner is apt to become large.

When taking these proposals into consideration, it seems to be beneficial to arrange only one f θ lens for all laser beams and to fold laser beams going to photosensitive drums after passing through the f θ lens by plural reflecting mirrors in order to reduce a size and cost of a multi-beam optical scanner.

However, at the same time when laser beams going to photosensitive drums are, a space between a multi-beam optical scanner and respective image forming units may be reduced more than needed. Since this limits a size of toner cartridge incorporated in each image forming unit and may cause such a problem that the number of toner supplies or exchange of a toner cartridges will increase.

Further, in many cases, on a color image forming apparatus using a multi-beam optical scanner, as frequency of a single color image formation in a black toner is more than that of colored image formation, there is such a problem that the number of exchanges of a black toner cartridge only will increase.

SUMMARY OF THE INVENTION

It is an object of the present invention to provide a thin multi-beam optical scanner that is used in an image forming apparatus to provide color images.

According to the present invention, there is provided an optical scanner comprising means having a plurality of reflecting surfaces for deflecting laser beams emitted from light sources; an f θ lens through which the laser beams pass for correcting fluctuation of the laser beams caused by the plural uneven reflecting surfaces of the deflecting means; first reflecting means provided at a first side to the optical axis of the f θ lens for reflecting the laser beams passed through the f θ lens; second reflecting means provided at a second side opposite to the first side to the optical axis of the f θ lens for reflecting the laser beams reflected by the first reflecting means to lead the laser beams onto photosensitive drums arranged at the second side; means provided at the first side for holding the f θ lens; and means provided at a position closer to the optical axis of the f θ lens than the second reflecting means at the second side for pressing the f θ lens against the holding means.

DETAILED DESCRIPTION OF THE PREFERRED EMBODIMENTS

Figure 1:
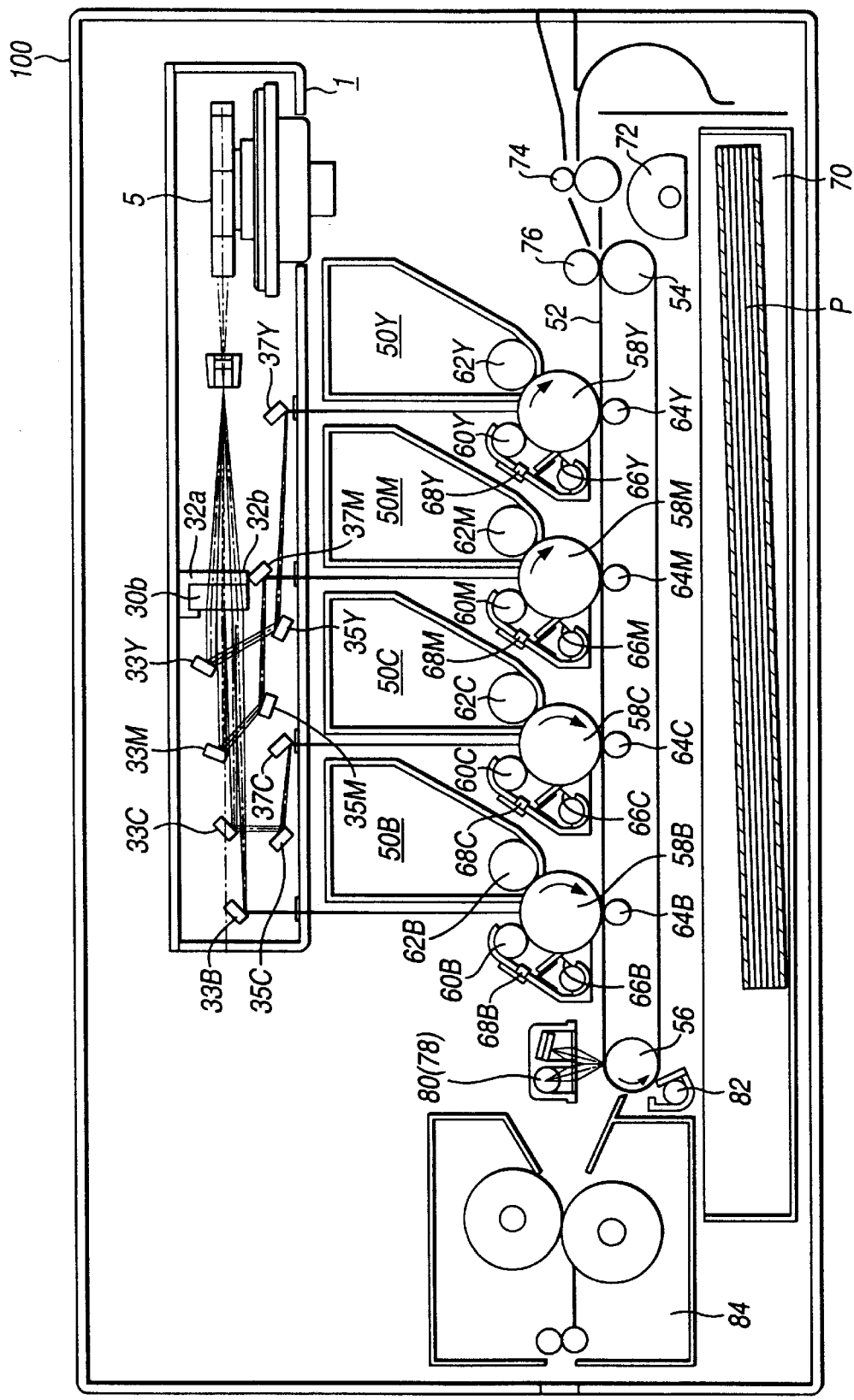
FIG. 1 is a schematic cross-sectional view of an image forming apparatus using a multi-beam optical scanner that is an embodiment of the present invention.

Hereinafter, preferred embodiments of the present invention will be described in detail referring to the drawings.

FIG. 1 is a front sectional view of four-drums color image forming apparatus incorporating a multi-color optical scanner, applied as an embodiment of the present invention.

An image forming apparatus 100 has a first through a fourth image forming units 50Y, 50M, 50C and 50B to form an image for each of decomposed color components, that is, Y=Yellow, M=Magenta, C=Cyan and B=Black.

The image forming units 50Y, 50M, 50C and 50B are arranged in series in order of 50Y, 50M, 50C and 50B at the lower part of an optical scanner 1 corresponding to the positions from where laser beams LY, LM, LC and LB are emitted via third mirrors 37Y, 37M, 37C and a first mirror 33B of the optical scanner 1 corresponding to color component images.

At the lower parts of the image forming units 50Y, 50M, 50C and 50B, there is arranged a conveyor belt 52 to convey images formed by the image forming units 50Y, 50M, 50C and 50B.

The conveyor belt 52 is put over a belt driving roller 56 that is driven in the arrow direction by a motor (not shown) and a tension roller 54 and is rotated at a prescribed speed in the direction in which the belt driving roller 56 is rotated.

The image forming units 50Y, 50M, 50C and 50B are provided with photosensitive drums 58Y, 58M, 58C and 58B which are formed in the cylindrical shape and rotatable in the arrow direction and on which electrostatic latent images are formed corresponding to image data to be printed.

At prescribed positions around the photosensitive drums 58Y, 58M, 58C and 58B, charging units 60Y, 60M, 60C and 60B, developing units 62Y, 62M, 62C and 62B, transferring units 64Y, 64M, 64C and 64B, cleaner 66Y, 66M 66C and 66B and discharging units 68Y, 68M, 68C and 68B are arranged in order along the rotating direction of the photosensitive drums 58Y, 58M, 58C and 58B.

The charging units 60Y, 60M, 60C and 60B supply prescribed surface potential to the surfaces of the photosensitive drums 58Y, 58M, 58C and 58B.

The developing units 62Y, 62M, 62C and 62B develop electrostatic latent images formed on the surfaces of the photosensitive drums 58Y, 58M, 58C and 58B with toners in corresponding colors.

The transferring units 64Y, 64M, 64C and 64B are positioned to face the photosensitive drums 58Y, 58M, 58C and 58B, respectively with the conveyor belt 52 put between them and transfer toner images formed on respective photosensitive drums 58Y, 58M, 58C and 58B on the conveyor belt 52 or a paper P conveyed by the conveyor belt 52.

The cleaners 66Y, 66M, 66C and 66B remove residual toners remained on the surfaces of the photosensitive drums 58Y, 58M, 58C and 58B after toner images are transferred by the transferring units 64Y, 64M, 64C and 64B.

The discharging units 68Y, 68M, 68C and 68B remove residual potential remained on respective photosensitive drums 58Y, 58M, 58C and 58B after toner images are transferred by the transferring units 64Y, 64M, 64C and 64B.

Further, laser beams LY, LM, LC and LB guided by mirrors 37Y, 37M, 37C and 33B of the optical scanner 1 are applied between the charging units 60Y, 60M, 60C and 60B and the developing units 62Y, 62M, 62C and 62B.

At the lower part of the conveyor belt 52 there is provided a paper cassette 70 to house recording medium, that is, paper P for transferring images formed by the image forming units 50Y, 50M, 50C and 50B.

At one end of the paper cassette 70 and near a tension roller 54, a semicircular shaped paper feed out roller 72 is provided to take out paper P housed in the paper cassette by one sheet at a time (from the top). There is provided an aligning roller 74 between the feed out roller 72 and the tension roller 54. The rotational timing of this aligning roller 74 is so controlled that the leading edge of a sheet of paper P taken out of the cassette 70 is aligned with the leading edges of toner images formed on respective photosensitive drums.

Near the tension roller 54, an adsorbing roller 76 is provided on the outer portion of the tension roller 54 with the conveyor belt 52 put between. This adsorbing roller 76 provides a prescribed electrostatic adsorbing force to a sheet of paper P conveyed at a prescribed timing via the aligning roller 74. Further, the axis of the adsorbing roller 76 and the tension roller 54 are arranged parallel to each other.

At one end of the conveyor belt 52, near and on the outer portion of the belt driving roller 56, registration sensors 78 and 80 are arranged with the conveyor belt 52 put between. These registration sensors 78 and 80 detect the position of an image formed on the conveyor belt 52 or the paper P conveyed by the conveyor belt. Further, the registration sensors 78 and 80 are arranged at a prescribed distance in the axial direction of the belt driving roller 56 (FIG. 1 shows only the rear sensor 80 as it is a front cross-sectional view).

On the conveyor belt 52 corresponding to the outer portion of the belt driving roller 56, a conveyor belt cleaner 82 is arranged to remove toners or paper refuse adhered on the conveyor belt 52.

In the direction in which a paper P conveyed by the conveyor belt 52 is further conveyed after separated from the tension roller 56, a fixing unit 84 is arranged to fix the toner image transferred on the paper P thereon.

Figure 2:
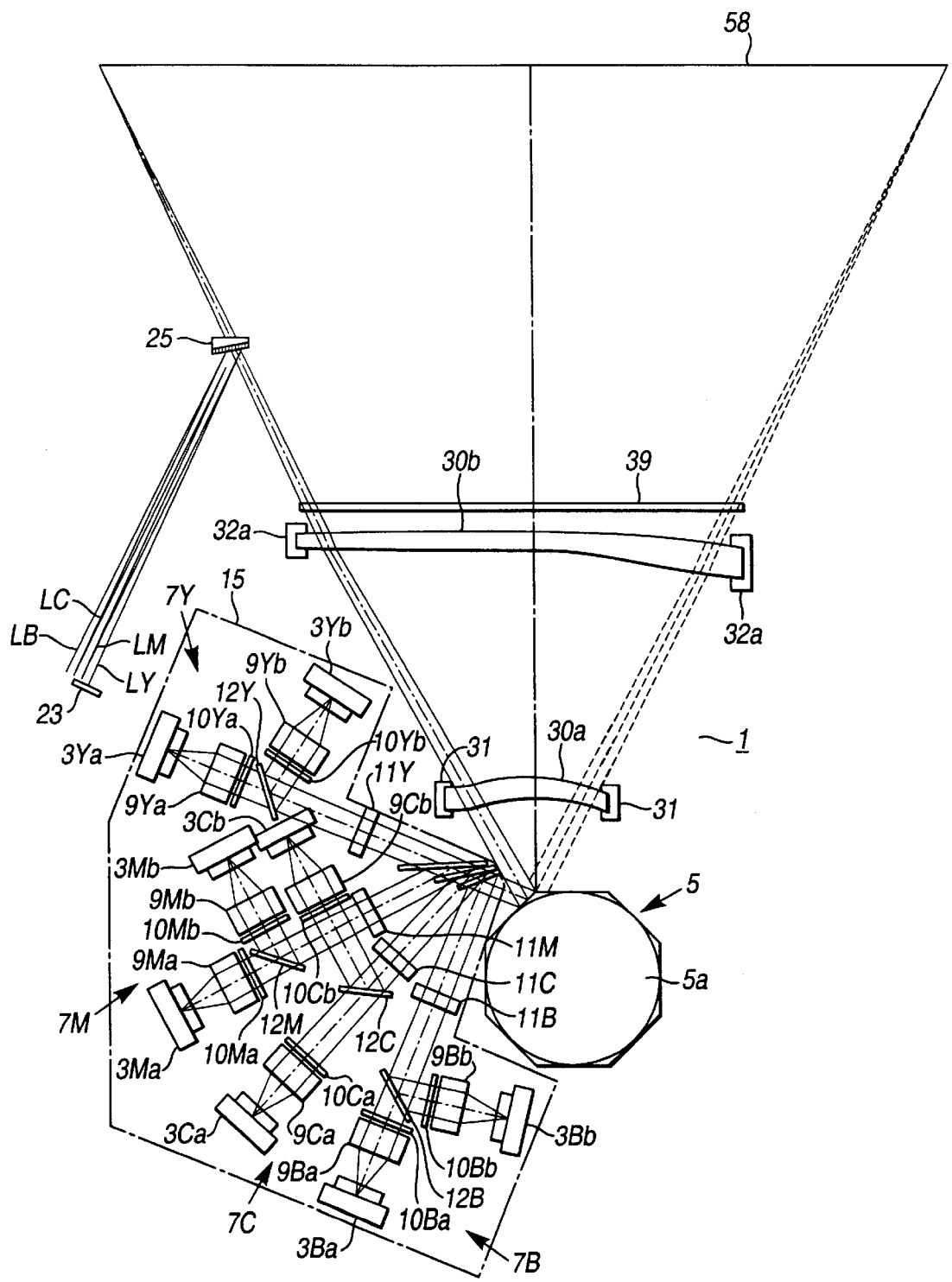
FIG. 2 is a schematic plan view showing the arrangement of optical members of an optical scanner incorporated in the image forming apparatus shown in FIG. 1.

In FIG. 2, a multi-beam optical scanner that is used in the color image forming apparatus shown in FIG. 1 is shown.

Further, in the color image forming apparatus shown in FIG. 1, 4 kinds of image data in decomposed color components of yellow (Y), magenta (M), cyan (C) and black (B) and 4 sets of various units to form images in color components corresponding to Y, M, C and B are normally used. Accordingly, image data in respective color components and corresponding units are identified by adding Y, M, C and B to respective reference numerals.

As shown in FIG. 2, the multi-beam optical scanner 1 has only one optical deflector 5 as a deflecting means to deflect laser beams emitted from laser devices which are light sources at a prescribed linear velocity toward the prescribed positions of the photosensitive drums 58Y, 58M, 58C and 58B. Further, hereinafter, the deflecting direction of laser beams by the optical deflector 5 is shown as the main scanning direction.

The optical deflector 5 has a polygon mirror 5a with plural, for instance, 8 plane deflecting mirrors arranged in the regular polygonal shape and a motor (not shown) which rotates the polygon mirror 5a in the main scanning direction at a prescribed velocity. The polygon mirror 5a is formed by, for instance, aluminum. Further, such a surface protective layer as silicon dioxide, etc. is evaporated on the reflecting surfaces of the polygon mirror 5a.

Between the optical deflector 5 and the surfaces of the photosensitive drums, that is, image surfaces, there are provided a post-deflection optical system 30, a horizontal synchronization detector 23 and a mirror 25.

The post-deflection optical system 30 is composed of a first and a second f θ lenses 30a and 30b to give prescribed optical characteristics to laser beams deflected in a prescribed direction by the reflecting surfaces of the optical deflector 5. The first and the second f θ lenses 30a and 30b have the function to correct fluctuation of laser beams produced by the uneven reflecting surfaces of the optical deflector 5.

The horizontal synchronization detector 23 detects that an individual beam of the composite laser beams LY, LM, LC and LB emitted from the second f θ lens 30b of the post-deflection optical system 30 arrives at a prescribed position before an area into which an image is written.

The mirror 25 is arranged between the post-deflection optical system 30 and the horizontal synchronization detector 23 to partially reflect the composite 2×4 laser beams LY, LM, LC and LB passed through at least one lens in the post-deflection optical system 30, which will be described later, in the different main and sub-scanning directions toward the horizontal synchronization detector 23.

Further, the first and the second f θ lenses 30a and 30b are held by a pair of left and right fixing members 31, 31, 32a and 32a at their both ends in the main scanning direction of the region wherein the image forming portions of 4 laser beams close to the sub-scanning direction continuously reflected on the reflecting surfaces of the optical reflector 5 are not intercepted.

Next, the pre-deflection optical system between the laser devices which are light sources and the optical deflector 5 will be described in detail.

The optical scanner 1 includes a first and a second (N1=N2=N3=N4=2) laser devices satisfying Ni (i is a positive integer) and has a first through a fourth light sources to generate laser beams corresponding to image data decomposed into respective color components.

The first through the fourth light sources have a first yellow laser device 3Ya and a second yellow laser device 3Yb to emit laser beams corresponding to an yellow image, a first magenta laser device 3Ma and a second magenta laser device 3Mb to emit laser beams corresponding to a magenta image, a first cyan laser device 3Ca and a second cyan laser device 3Cb to emit laser beams corresponding to a cyan image and a first black laser device 3Ba and a second black laser device 3Bb to emit laser beams corresponding to a black image, respectively.

Further, the mutually paired first through fourth laser beams LYa and LYb, LMa and LMb, LCa and LCb, and LBa and LBb laser beams are emitted from respective laser devices.

Between respective laser devices 3Ya, 3Ma, 3Ca and 3Ba and the optical deflector 5, four sets of pre-deflection optical systems 7Y, 7M, 7C and 7B to regulate the sectional beam spot shapes of the laser beams LYa, LMa, LC a and LBa from the laser devices 3Ya, 3Ma, 3Ca ad 3Ba to a prescribed shape are arranged.

Now, the pre-deflection optical system 7Y will be described using the laser beam LYa emitted from the first yellow laser device 3Ya to the optical deflector 5 as a representative.

The diffusive laser beam emitted from the first yellow laser device 3Ya is given with a prescribed focusing property by a limited focusing lens 9Ya and its sectional beam is shaped to a prescribed shape by a diaphragm 10Ya. The laser beam LYa passed through the diaphragm 10Ya is further given with a prescribed focusing property only for the sub-scanning direction through a hybrid cylindrical lens 11Y and guided to the optical deflector 5.

Between the limited focusing lens 9Ya and the hybrid cylindrical lens 11Y, a half mirror 12Y is inserted to the optical axis between the limited focusing lens 9Ya and the hybrid cylindrical lens 11Y at a prescribed angle.

In the half mirror 12, the second yellow laser device 3Yb is arranged on the surface opposite to the surface to which the laser beam LYa is applied from the first yellow laser device 3Ya so that the laser beam LYb is applied. This laser beam LYb is applied to the laser beam LYa in the sub-scanning direction at a prescribed beam distance. Further, between the second yellow laser device 3Yb and the half mirror 12Y, a limited focusing lens 9Yb to give a prescribed focusing property to the laser beam LYb from the second yellow laser device 3Yb and a diaphragm 10Yb are provided.

The laser beams LYa and LYb which are substantially combined into one laser beam with a prescribed beam distance in the sub-scanning direction through the half mirror 12Y pass through a laser composite mirror unit 13 that is described later using FIG. 7A and FIG. 7B and are guided to the optical deflector 5.

Hereinafter, in the same manner as above, regarding magenta images, a limited focusing lens 9Ma, a diaphragm 10MA, a hybrid cylindrical lens 11M, a half mirror 12M, a second magenta laser device 3Mb, a limited focusing lens 9Mb and a diaphragm 10Mb are arranged at prescribed positions between a first magenta laser device 3Ma and a composite laser mirror unit 13.

Regarding cyan images, a limited focusing lens 9Ca, a diaphragm 10Ca, a hybrid cylindrical lens 11C, a half mirror 12C, a second cyan laser device 3Cb, a limited focusing lens 9Cb and a diaphragm 10Cb are arranged at prescribed positions between a first cyan laser device 3Ca and a composite laser mirror unit 13.

Regarding black images, a limited focusing lens 9Ba, a diaphragm 10Ba, a hybrid cylindrical lens 11B, a half mirror 12B, a second black laser device 3Bb, a limited focusing lens 9Bb and a diaphragm 10Bb are arranged at prescribed positions between a first black laser device 3Ba and a composite laser mirror unit 13.

Further, the laser devices 3Ya, 3Yb, 3Ma, 3Mb, 3Ca, 3Cb, 3Ba and 3Bb, the pre-deflection optical systems 7Y, 7M, 7C and 7B, and the composite laser mirror unit 13 are held collectively by a holding member that is formed using, for instance, aluminum alloy, etc.

For the limited focusing lenses 9Ya, 9Ma, 9Ca and 9Ba and 9Yb, 9Mb, 9Cb and 9Bb, a single non-spherical glass lens or spherical glass lens with a UV rigid plastic non-spherical lens (not shown) adhered is used.

Figure 3:
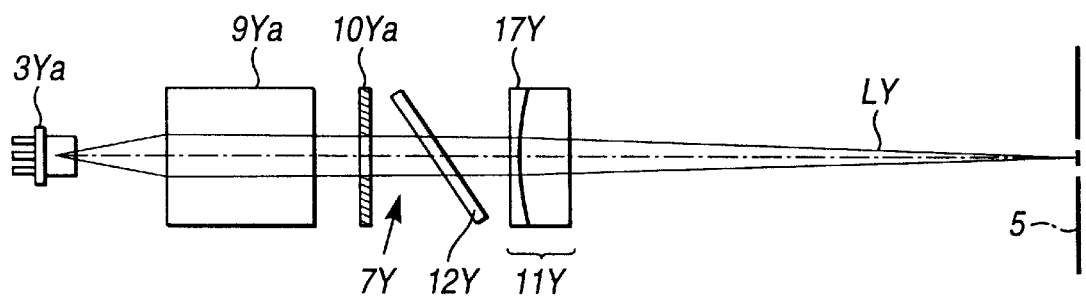
FIG. 3 is a partial cross-sectional view with the optical scanner shown in FIG. 2 cut along the optical axis of the system between a first light source and an optical deflector.

FIG. 3 is a partially cross-sectional view of the pre-deflection optical system 7Y showing the optical path from the laser device 3Ya to the reflecting surface of the optical deflector 5 viewed from the sub-scanning direction. Further, in FIG. 3 only optical parts for one laser beam LY (Lya) are shown representatively.

The hybrid cylindrical lens 11Y is formed by a cylindrical lens 17Y made of such plastic as PMMA (polymethylmethacryl), etc. and a glass cylindrical lens 19Y which have a substantially equal curvature for the sub-scanning direction each other. The air contacting surface of the cylindrical lens 17Y is formed nearly plane.

Further, the hybrid cylindrical lens 11Y is formed in one united body by adhering between the emitting surface of the cylindrical lens 17Y and the incident surface of the cylindrical lens 19Y or pressing them against a positioning member from a prescribed direction. In addition, the hybrid cylindrical lens 11Y may be in one united body by forming the cylindrical lens 17Y on the incident surface of the cylindrical lens 19Y.

The plastic cylindrical lens 17Y is formed using such a material as PMMA (polymethlmethacryl). The glass cylindrical lens 19Y is formed using such a material as $TaSF_{21}$. Further, the cylindrical lenses 17Y and 19Y are fixed at an accurate distance to the limited focusing lens 9 by a positioning portion that is formed in one united body with the holding member 15.

Optical numerical data of the pre-deflection optical system 7 are shown in Table 1 through Table 3 below.

TABLE 1

Pre-Deflection Optical System Lens Data

Unit of angle: rad.
Effective angle of deviation: .476
Angle of separation: .698
Radius of the reflecting surface inscribed circle of the optical deflector: 33
Rotating center of the reflecting surface of the optical deflector: (26, 31, 20, 10)
For Yellow & Black
   Radius of Curvature

| Main Scanning | Sub-Scanning | Thickness | Material | Others |
|---|---|---|---|---|
| — | — | 11.882 | Air | f = 11.55 |
| Plane | Plane | 52.331 | Air | NA = 0.33 |
| Plane | 2.711E-2 | 0.1 | PMMA | |
| Plane | Plane | 5.0 | Glass | n = 1.992 |
| | | 65.879 | Air | |

Offset from the optical axis on the reflecting surface of the optical deflector: −3.344
Tilt from the optical axis on the reflecting surface of the optical deflector: 2.828E-2
Eccentricity of the main ray of light incident to the cylindrical lens 17: −3.567E-4 (The ray of light b is reverse to this code)
Tilt of the main ray of light incident to the cylindrical lens 17: −8.436E-5

TABLE 2

Pre-Deflection Optical System Lens Data

Unit of angle: rad.
Effective angle of deviation: .476
Angle of separation: .698
Radius of the reflecting surface inscribed circle of the optical deflector: 33
Rotating center of the reflecting surface of the optical deflector: (26, 31, 20, 10)
For Magenta
   Radius of Curvature

| Main Scanning | Sub-Scanning | Thickness | Material | Others |
|---|---|---|---|---|
| — | — | 11.882 | Air | f = 11.55 |
| Plane | Plane | 56.664 | Air | NA = 0.33 |
| Plane | 2.711E-2 | 0.1 | PMMA | |
| Plane | Plane | 5.0 | Glass | n = 1.992 |
| | | 65.802 | Air | |

Offset from the optical axis on the reflecting surface of the optical deflector: −1.562
Tilt from the optical axis on the reflecting surface of the optical deflector: 1.213E-2
Eccentricity of the main ray of light incident to the cylindrical lens 17: −3.698E-5 (The ray of light b is reverse to this code)
Tilt of the main ray of light incident to the cylindrical lens 17: −8.697E-5

TABLE 3

Pre-Deflection Optical System Lens Data

Unit of angle: rad.
Effective angle of deviation: .476
Angle of separation: .698
Radius of the reflecting surface inscribed circle of the optical deflector: 33
Rotating center of the reflecting surface of the optical deflector: (26, 31, 20, 10)
For Cyan
   Radius of Curvature

| Main Scanning | Sub-Scanning | Thickness | Material | Others |
|---|---|---|---|---|
| — | — | 11.882 | Air | f = 11.55 |
| Plane | Plane | 57.728 | Air | NA = 0.33 |
| Plane | 2.711E-2 | 0.1 | PMMA | |
| Plane | Plane | 5.0 | Glass | n = 1.992 |
| | | 65.790 | Air | |

Offset from the optical axis on the reflecting surface of the optical deflector: −0.537
Tilt from the optical axis on the reflecting surface of the optical deflector: 3.788E-3
Eccentricity of the main ray of light incident to the cylindrical lens 17: 4.448E-3 (The ray of light b is reverse to this code)
Tilt of the main ray of light incident to the cylindrical lens 17: −9.950E-5

As clearly seen from Tables 1 through 3, for the limited focusing lens 9 and the hybrid cylindrical lens 11 corresponding to respective color components, the same lens is used for any color component as a simple substance. Further, the pre-deflection optical systems 7Y corresponding to Y (Yellow) and 7B corresponding to B (Black) have the substantially same lens arrangement. The pre-deflection optical systems 7M corresponding to M (Magenta) and 7C corresponding to C (Cyan) have a distance between the limited focusing lens 9 and the hybrid cylindrical lens 11 wider than that of the pre-deflection optical systems 7Y and 7B.

Figure 4:
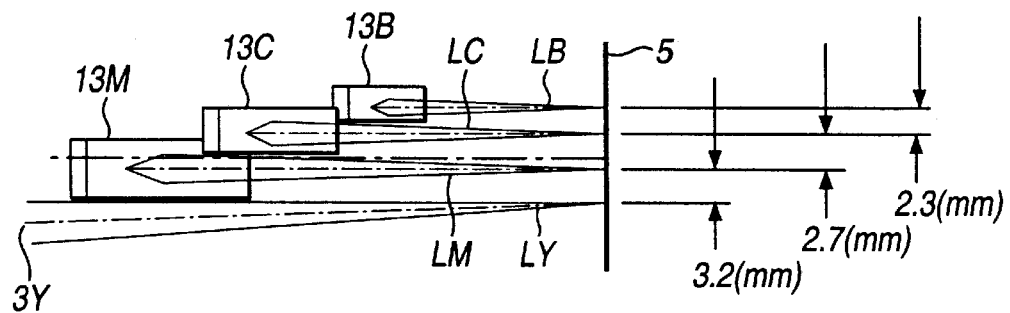
FIG. 4 is a schematic diagram showing the partial cross-sectional view of sub-scanning direction of the optical scanner shown in FIG. 2 and the state of a first through a fourth laser beams going to an optical deflector.

In FIG. 4, the laser beams LY, LM and LC (LY is composed of LYa and LYb, LM is composed of LMa and LMb, and LC is composed of LCa and LCb) emitted to the optical deflector 5 from the reflecting surfaces 13Y, 13M and 13C of the composite laser mirrors in the direction orthogonal to the rotary axis of the reflecting surface of the optical deflector 5 (the sub-scanning direction) are shown.

As clearly seen from FIG. 4, the laser beams LY, LM, LC and LB are guided to the optical deflector 5 at mutually different intervals in the direction parallel to the rotary axis of the reflecting surfaces of the optical deflector 5. Further, the laser beams LM and LC are guided to the reflecting surfaces of the optical deflector 5 orthogonally to the rotary axis of the reflecting surfaces of the optical deflector 5 and asymmetrically to the surface containing the center of the sub-scanning direction of the reflecting surfaces, that is, with the surface containing the optical axis of the optical scanner 1 put between. Further, the mutual distances between the laser beams LY, LM, LC and LB on the reflecting surfaces of the optical deflector 5 are 3.2 mm between LY and LM, 2.7 mm between LM and LC, and 2.3 mm between LC and LB.

Figure 5:
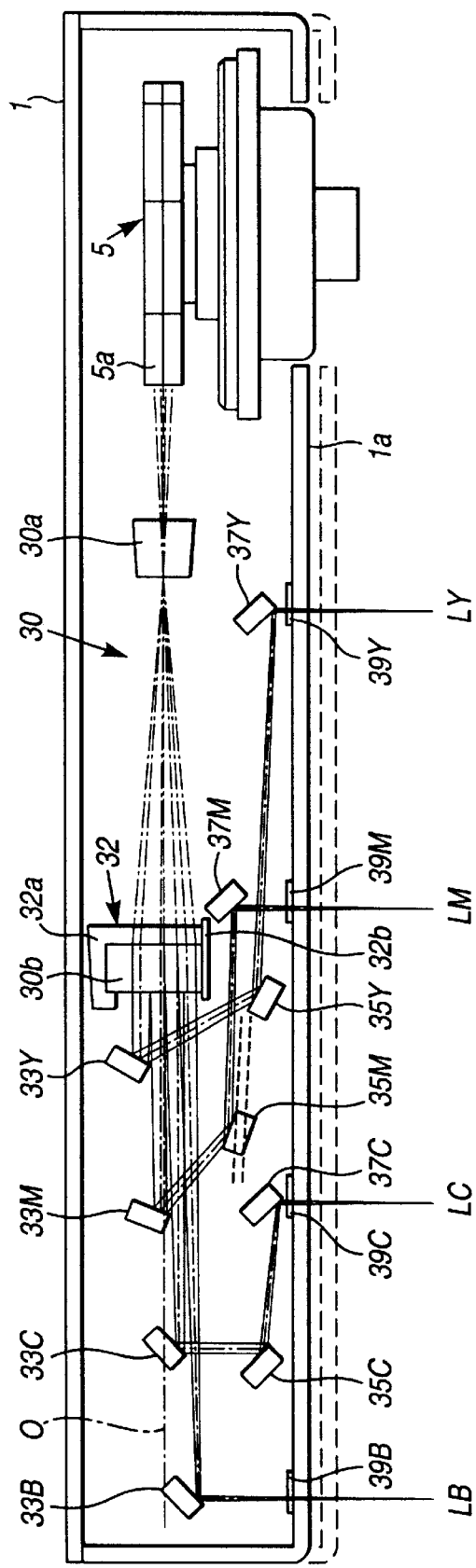
FIG. 5 is a schematic cross-sectional view with the optical scanner shown in FIG. 2 cut at a position where a deflection angle of the deflector is 0°.

FIG. 5 shows the state of the optical members arranged between the optical deflector 5 of the optical scanner 1 and the photosensitive drums 58, that is, the image surfaces viewed from the sub-scanning direction at the position where the angle of deflection of the optical deflector 5 is 0°.

As shown in FIG. 5, between the second f θ lens 30b of the post-deflection optical system 30 and the image surfaces, there are provided first mirrors 33Y, 33M, 33C and 33B to reflect 2×4 laser beams LY, LM, LC and LB passed through the lens 30b to the image surfaces, and second and third mirrors 35Y, 35M and 35C and 37Y, 37M and 37C to further reflect laser beams LY, LM and LC reflected by the first mirrors 33Y, 33M and 33C. Further, as clear from FIG. 5, the laser beam LB corresponding to a B (black) image is guided to the image surface without passing through other mirrors after reflected by the first mirror 33B. That is, the second mirrors 35Y, 35M and 35C and the third mirrors 37Y, 37M and 37C are provided in three units for 4 laser beams. Further, the first and the second laser beams LY and LM reflected on the reflecting surfaces of the optical deflector 5 and passed the direction getting away the photosensitive drum 58 rather than the system optical axis of the first and the second f θ lenses 30a and 30b are reflected on the second mirrors 35Y and 35M and after crossing each other, guided to the corresponding photosensitive drums 58Y and 58M by the third mirrors 37Y and 37M.

By the way, the first f θ lenses 30a, the first mirrors 33Y, 33M, 33C and 33B and the second mirrors 35Y, 35M and 35C are fixed to an intermediate base 1a of the optical scanner 1 by plural fixing members (not shown) that are formed in one united body with the intermediate base 1a via a fixing member 31. Further, the third mirrors 37Y, 37M and 37C are arranged movable at least in one direction vertical to the mirror surface via a fixing rib, which will be described later using FIG. 10, and a tilt adjusting mechanism.

At the positions between the third mirrors 37Y, 37M, 37C and the first mirror 33B and an image surface, where 2×4=8 laser beams LY, LM, LC and LB reflected from the mirrors 33B, 37Y, 37M and 37C are emitted from the optical scanner 1, dust-proof glasses 39Y, 39M, 30C and 39B are arranged to protect the inside of the optical scanner 1.

On the contrary, the second f θ lens 30b is fixed by a fixing member 32 at the opposite side of the photosensitive drums 58Y, 58M, 58C and 58B in the housing, that is, on the optical axis 0 of the system defined between the centers of respective reflecting surfaces of the optical deflector 5 in the sub-scanning direction and the first mirrors 33Y, 33M, 33C and 33B while pushed against the first mirror 33Y side in the housing 1.

In detail, the second f θ lens 30b is held by the housing 1 in a region wherein the image portions of 4 laser beams close to the sub-scanning direction, continuously reflected on the reflecting surfaces of the optical deflector are not intercepted as described in the above using FIG. 2, that is, the second f θ lens 30b are held by the housing 1 at both ends independently from the intermediate base 1a by a pair of the left and right fixing members 32.

More in detail, the fixing member 32 is formed in one united body with the housing 1 or is formed by a positioning member 32a fixed at a prescribed position in the housing 1 by, for instance, bonding before fixing the intermediate base 1a to the housing 1 and a presser blade spring 32b having a high rigidity that is formed by stainless steel or phosphor bronze, etc. to press down the second f θ lens 30b against the positioning member 32a. Further, the positioning member 32a is formed in a shape to wrap in three sides of the f θ lens 30b with one side in the direction most close to the photosensitive drum 58 kept open in the state viewed from its sub-scanning directional section. Thus, the clearance between the magenta laser beam going to the third mirror 37M from the second mirror 35M which might possibly be intercepted so far by a holding member to hold the second f θ lens 30b can be sufficiently secured.

When showing one instance, when the intermediate base 1a and the holding member are formed by resin represented by, for instance, polycarbonate containing glass, and the like and the holding member is fixed on the interediate base 1a, the thickness of the intermediate base 1a and that of the holding member are about 4 millimeter (hereinafter, referred to as mm), respectively. A distance needed between the magenta laser beam going to the third mirror 37M from the second mirror 35M and the bottom of the second f θ lens 30b is about 10 mm.

On the contrary, according to the presser blade spring 32b and the positioning member 32a that is fixed to the housing 1 as described above, a distance between the bottom of the second f θ lens 30b and the magenta beam going to the mirror 37M from the mirror 35M is reduced by about 2 mm. That is, the thickness of the intermediate base 1a and that of the fixing member that is formed in one united body with the intermediate base 1a can be reduced substantially to only the thickness of the presser blade spring 32b.

In this embodiment, for instance, the thickness of the positioning member 32a is 4 mm and that of the presser blade spring 32b is 0.5 mm.

Further, it is not always necessary to make the distance between the presser blade spring 32b and the magenta laser beam going from the second mirror 35M to the third mirror 37M wider than before and as a result, the thickness of the optical scanner 1 can be reduced. Thus, the thickness of an image forming apparatus is also reduced.

Accordingly, if the size of an image forming apparatus remains unchanged, the capacity of a toner hopper of a developing unit 62 that is arranged close to the optical scanner 1 can be increased. As a result, when compared with frequency of color image formation, the number of supplies of black toner can be reduced even when a single color image in black is frequently formed.

Further, the third mirrors 37Y, 37M and 37C are arranged movable at least in one direction relative to the direction vertical to the mirror surface via a fixing rib and a tilt adjusting mechanism that will be described later referring to FIG. 9.

At the positions between the third mirrors 37Y, 37M, 37C and the first mirror 33B and image surfaces, where 2×4=8 laser beams LY, LM, LC and LB reflected via the mirrors 33B, 37Y, 37M and 37C are emitted from the optical scanner 1, dust-proof glasses 39Y, 39M, 30C and 39B are arranged to protect the inside of the optical scanner 1.

Next, the optical characteristics between the hybrid cylindrical lens 11 and the first and the second f θ lenses 30a and 30b as the post-deflection optical system 30 will be described in detail.

The post-deflection optical system 30, that is, the first and the second f θ lenses 30a and 30b of two-pieces set lens are formed by plastic, for instance, PMMA. From this, it is known that the refractive index n changes from 1.4876 to 1.4789 at ambient temperatures between, for instance, 0° to 50°. In this case, the image forming surface where the laser beam passed through the first and the second f θ lenses 30a and 30b is actually condensed, that is, the image forming position in the sub-scanning direction fluctuates by about ±12 mm.

From this, it is possible to suppress the fluctuation of the image forming surface resulting from the change in refractive index n due to the temperature change to about ±0.5 mm by incorporating lenses made of the same material as that of lenses used in the post-deflection optical system 30 in the pre-deflection optical system 7 shown in FIG. 3 with the state of optimized curvature. That is, when compared with a conventional optical system using glass lenses in the pre-deflection optical system 7 and plastic lenses in the post-deflection optical system 30, the color aberration in the sub-scanning direction generated from the change in the refractive index due to the temperature change of lenses of the post-deflection optical system 30 can be corrected.

Figure 6:
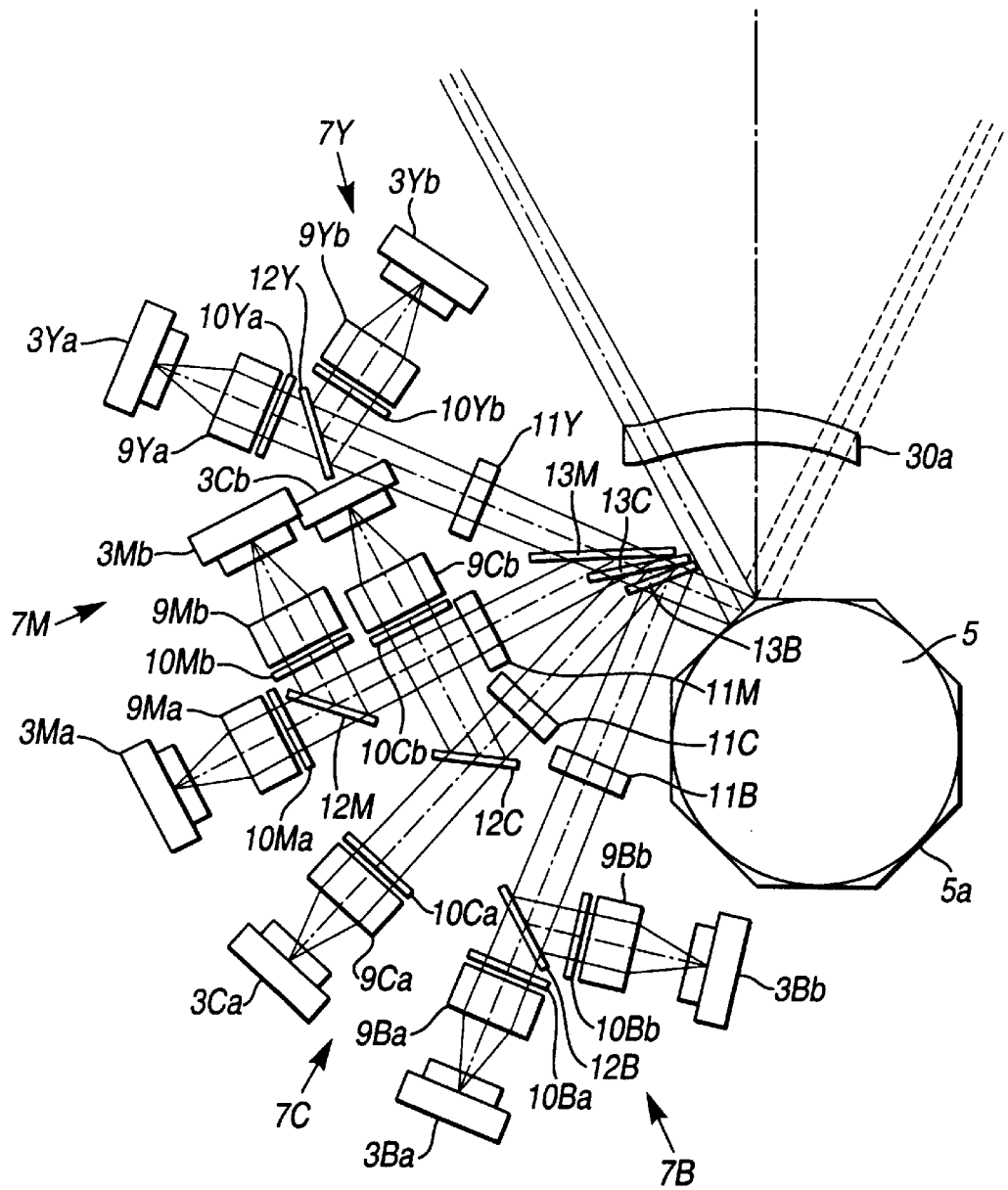
FIG. 6 is a schematic plan view showing the state of optical members of a pre-deflection optical system of the optical scanner shown in FIG. 2.

FIG. 6 shows the arrangement of the laser devices used in the pre-deflection optical system shown in FIG. 2 in detail.

As described referring to FIG. 2 in the above, the first through the fourth laser devices 3Y, 3M, 3C and 3B have two-pieces sets of the first and second yellow laser devices 3Ya and 3Yb, the first and second magenta laser devices 3Ma and 3Mb, the first and second cyan laser devices 3Ca and 3Cb, and the first and second black laser devices 3Ba and 3Bb. Further, the respective paired laser devices are arranged in the sub-scanning direction at a prescribed distance corresponding to the beam distance on the image surfaces described later. In addition, the respective paired sets of laser devices, that is, the paired sets corresponding to the color components are arranged in 4 layers in the state viewed from the sub-scanning direction at the distance in the sub-scanning direction defined in advance corresponding to the respective reflecting regions of the composite laser mirror block 13 shown in FIG. 7A and FIG. 7B.

Figure 7A:
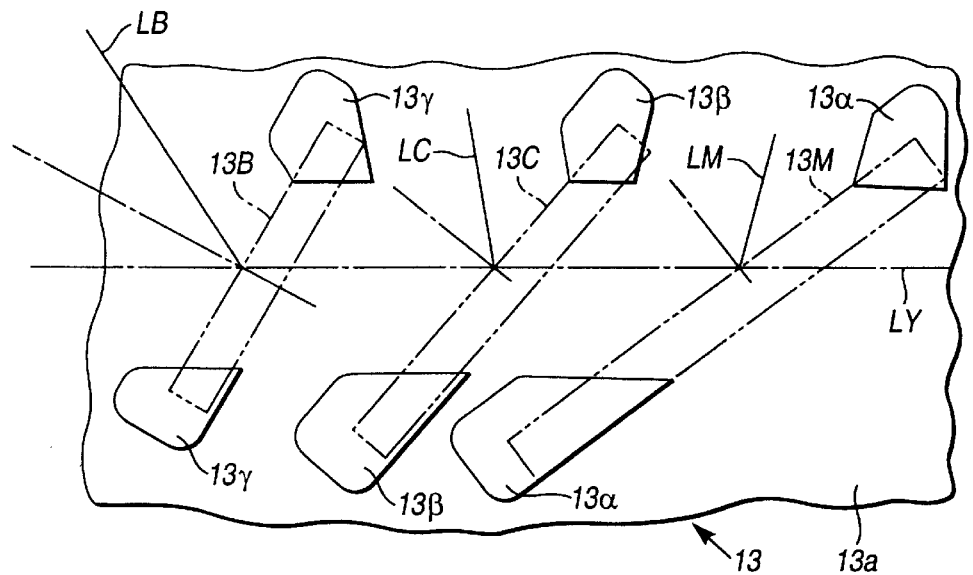
FIG. 7A is a plan view showing a composite laser mirror unit of the optical scanner shown in FIG. 2.
Figure 7B:
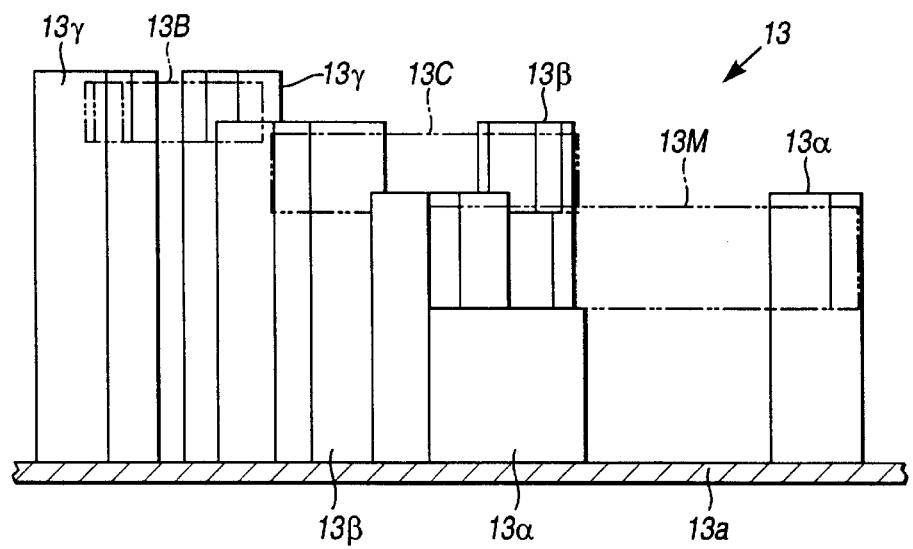
FIG. 7B is a side view of the composite laser mirror unit shown in FIG. 7A.
Figure 8:
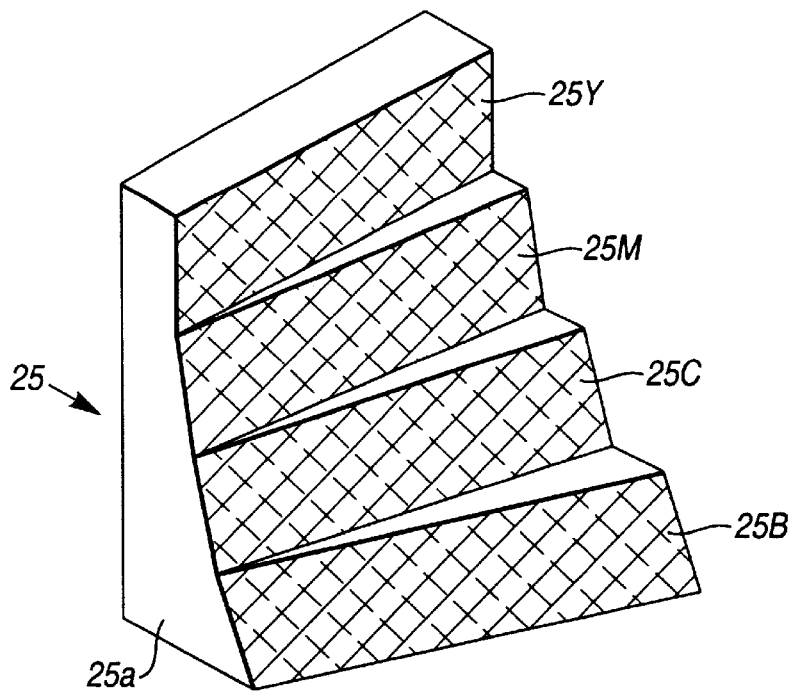
FIG. 8 is a schematic perspective view of a mirror for detecting the horizontal synchronization of the optical scanner shown in FIG. 2.

FIGS. 7A and 7B8 show the composite laser mirror unit 13 which guides 2×4 first through fourth laser beams LY, LM, LC and LB as one bundle of laser beams to the reflecting surfaces of the optical deflector 5.

The composite laser mirror unit 13 is composed of the first through the third mirrors 13M, 13C and 13B that are provided in the number less than the number of color components capable of forming an image (the number of decomposed colors) M by "1", a first through a third mirror holders 13α, 13β and 13γ and a base 13a to support the respective mirror holders 13α, 13β and 13γ. Further, the base 13a and the respective holders 13α, 13β and 13γ are formed in one united body using, for instance, aluminum alloy which has a less coefficient of thermal expansion.

By the way, the laser beam LY emitted from the laser device 3Y, that is, the first yellow laser device 3Ya and the second yellow laser device 3Yb is led directly to the reflecting surfaces of the optical deflector 5 as described in the above. In this case, the laser beam LY passes through the base 13a side, that is, between the mirror 13M fixed by the first holder 13α and the base 13a rather than the optical axis of the system of the optical scanner 1.

Next, the intensity (quantity of light) of the laser beams LM, LC and LB reflected on the mirrors 13M. 13C and 13B of the composite mirror unit 13 and led to the optical deflector 5 and the laser beam LY led directly to the optical deflector 5 will be described.

According to the composite laser mirror unit 13 shown in FIGS. 7A and 7B, the laser beams LM, LC and LB are reflected by the normal mirrors (13M, 13C and 13B) in the region where the laser beams LM, LC and LB in the front stage to apply to the reflecting surfaces of the optical deflector 5 are separated in the sub-scanning direction. Accordingly, the quantity of light of the laser beams LM, LC and LB supplied toward the polygon mirror 5a after reflecting on the reflecting surfaces (13M, 13C and 13B) can be maintained almost at more than 90% of the quantity of light emitted from the limited focusing lens 9. Thus, it becomes possible not only to reduce the output of each laser device but also to uniformly correct the aberration of light reached at an image surface because aberration as a tilted parallel-plate is not generated. As a result, it becomes possible to narrow down respective laser beams and to correspond to get a highly precise image. Further, the laser device 3Y corresponding to Y (yellow) is led directly to the reflecting surfaces of the optical deflector 5 irrespective of any mirror of the composite mirror 13. From these facts, it is possible to reduce the output capacity of laser beams but also remove error in angle of incidence to the reflecting surfaces resulting from the reflection on the mirrors (13M, 13C and 13B) (may be produced in other laser beams reflecting on the composite mirrors).

Next, the relationship between the tilt of the laser beams LY, LM, LC and LB reflected on the polygon mirror 5a of the optical deflector 5 and laser beams LY, LM, LC and LB emitted to the outside of the optical scanner 1 passing through the post-deflection optical system 30 and the mirrors 33B, 37Y, 37M and 37C will be described.

As described in the above, the laser beams LY, LM, LC and LB reflected on the polygon mirror 5a of the optical deflector 5 and given with a prescribed aberration characteristic by the first and the second f θ lenses 30a and 30b are reflected in a prescribed direction by the first mirror 33Y, 33M, 33C and 33B.

At this time, the laser beam LB, after reflected on the first mirror 33B, passes through the dust-proof glass 39B and is led to the photosensitive drum 58b. On the contrary, the remaining laser beams LY, LM and LC are led to the mirrors 35Y, 35M and 35C, respectively and reflected on the second mirrors 35Y, 35M and 35C toward the third mirrors 37Y, 37M and 37C. Further, after reflected on the third mirrors 37Y, 37M and 37C and, they are focused to form an image on respective photosensitive drums at an almost equal interval after passing through the dust-proof glasses 39Y, 39M and 39C. In this case, the laser beam LB and the laser beam LC adjacent to the laser beams LB reflected on the first mirror 33B are focused to form an image on the photosensitive drums 58B and 58C, respectively.

By the way, the laser beam LB is only reflected on the mirror 33B after deflected on the polygon mirror 5a and emitted to the photosensitive drum 58 from the optical scanner 1. Thus, the laser beam LB that is led substantially only by the mirror 33B can be secured.

When there are a plurality of mirrors in the optical path, this laser beam LB is beneficial as a reference ray of light when the remaining laser beam L (Y, M and C) is relatively corrected in connection with fluctuation of various aberration characteristics of an image on the image forming surface that is increased (multiplied) with the number of mirrors.

Further, if there are a plurality of mirrors in the optical path, it is desirable to make the number of mirrors used for the laser beams LY, LM, LC or LB even to an odd number or even number. That is, as shown in FIG. 5, the number of mirrors in the post-deflection optical system relative to the laser beam LB is 1 (an odd number) excepting the polygon mirror 5a of the optical deflector 5 and the number of mirrors in the post-deflection optical system relative to the laser beams LC, LM and LY is 3 (an odd number), respectively except the polygon mirror 5a. Here, when assuming that the second mirror 35 is omitted in connection with any one of the laser beams LC, LM and LY, the bending direction of the main scanning line due to a tilt of the laser beam lens passing through the optical path where the second mirror 35 is omitted (the number of mirrors is an even number) becomes reverse to the bending direction of other laser beams, that is, the main scanning line due to the tilt of odd numbers of mirrors, causing a color deviation that is a harmful problem when reproducing prescribed colors.

Therefore, when reproducing prescribed colors by superposing 2×4 laser beams LY, LM, LC and LB, the number of mirrors arranged in the optical paths of the laser beams LY, LM, LC and LB are substantially unified to an odd or an even number.

In FIG. 8, the mirror 25 for the horizontal synchronization is shown in detail.

The mirror 25 for the horizontal synchronization reflects the composite laser beams LY, LM, LC and LB to the horizontal synchronization detector 23 in the main scanning direction at different timings. At the same time, it has a mirror block 25a to hold first through fourth mirror surfaces 25Y, 25M, 25C and 25B formed at different angles in both the main scanning and sub-scanning directions in the sub-scanning direction and respective mirrors 25Y, 25M, 25C and 25B collectively so as to be able to provide the substantially same height on the horizontal synchronization detector 23.

The mirror block 25a is formed by, for instance, polycarbonate containing glass. Further, the mirrors 25Y, 25M, 25C and 25B are formed on the corresponding positions of the block 25a, that are formed at prescribed angles, by evaporating such a metal as, for instance, aluminum.

Thus, it becomes possible not only to apply the laser beams LY, LM, LC and LB deflected by the optical deflector 5 to the same detecting position of one detector 23 but also to remove the deviation of the horizontal synchronization signal resulting from the deviation of sensitivity or position of detectors that may become a problem when arranging a plurality of detectors. Further, needless to say, the laser beams LY, LM, LC and LB are applied total 4 times per line in the main scanning direction to the horizontal synchronization detector 23 by the horizontal synchronizing mirror 25 and the horizontal synchronizing signal is obtained two times per laser beam.

Figure 9:
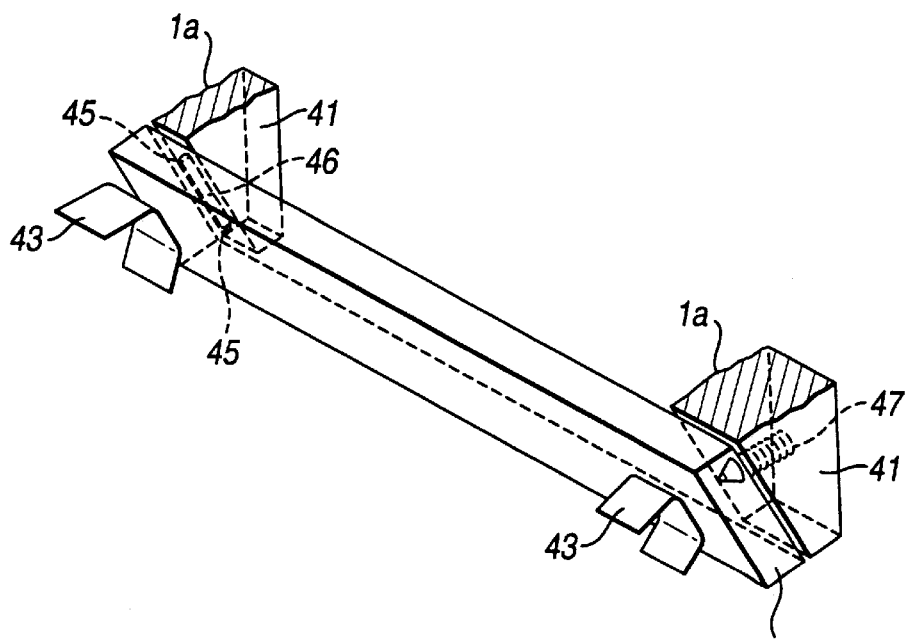
FIG. 9 is a schematic perspective view showing a reflecting mirror adjusting mechanism of the optical scanner shown in FIG. 2.

FIG. 9 is a schematic perspective view showing a supporting mechanism of the third mirrors 37Y, 37M and 37C.

The third mirrors 37Y, 37M and 37C are held at prescribed positions of the intermediate base 1a of the optical scanner 1 by fixing portions 41Y, 41M and 41C that are formed in one united body with the intermediate base 1a and mirror pressure blade springs 43Y, 43M and 43C that are opposed to the fixing portions 41Y, 41M and 41C with corresponding mirrors put between them.

The paired fixing portions 41Y, 41M and 41C are formed at both ends (the main scanning direction) of the mirrors 37Y, 37M and 37C, respectively. Two projections 45Y, 45M and 45C are formed on the other fixing portions 41Y, 41M and 41C to hold the mirrors 37Y, 37M and 37C at two points. Further, two projections 45Y, 45M and 45C may be ribs 46Y, 46M and 46C as shown by the dotted line in FIG. 9. Further, on the remaining fixing portions 41Y, 41M and 41C, set screws 47Y, 47M and 47C are provided to support the mirrors held by the projections 45Y, 45M and 45C rotatably in the direction vertical to the mirror surfaces or along the optical axis.

As shown in FIG. 9, the respective mirrors 37Y, 37M and 37C are moved in the direction vertical to the mirror surfaces or in the direction of the optical axis using the projections 45Y, 45M and 45C as the supporting points.

According to this method, the tilt in the main scanning direction, that is, the bending of the main scanning is correctable but the deviation in the distances in the sub-scanning direction of the composite laser beams LY, LM, LC and LB cannot be corrected. Therefore, the deviation in the distances in the sub-scanning direction is corrected by changing the horizontal write timing in a registration correction (adjusting) mode that will be described later.

Hereinafter, the registration correction (adjusting) mode will be described.

Figure 12:
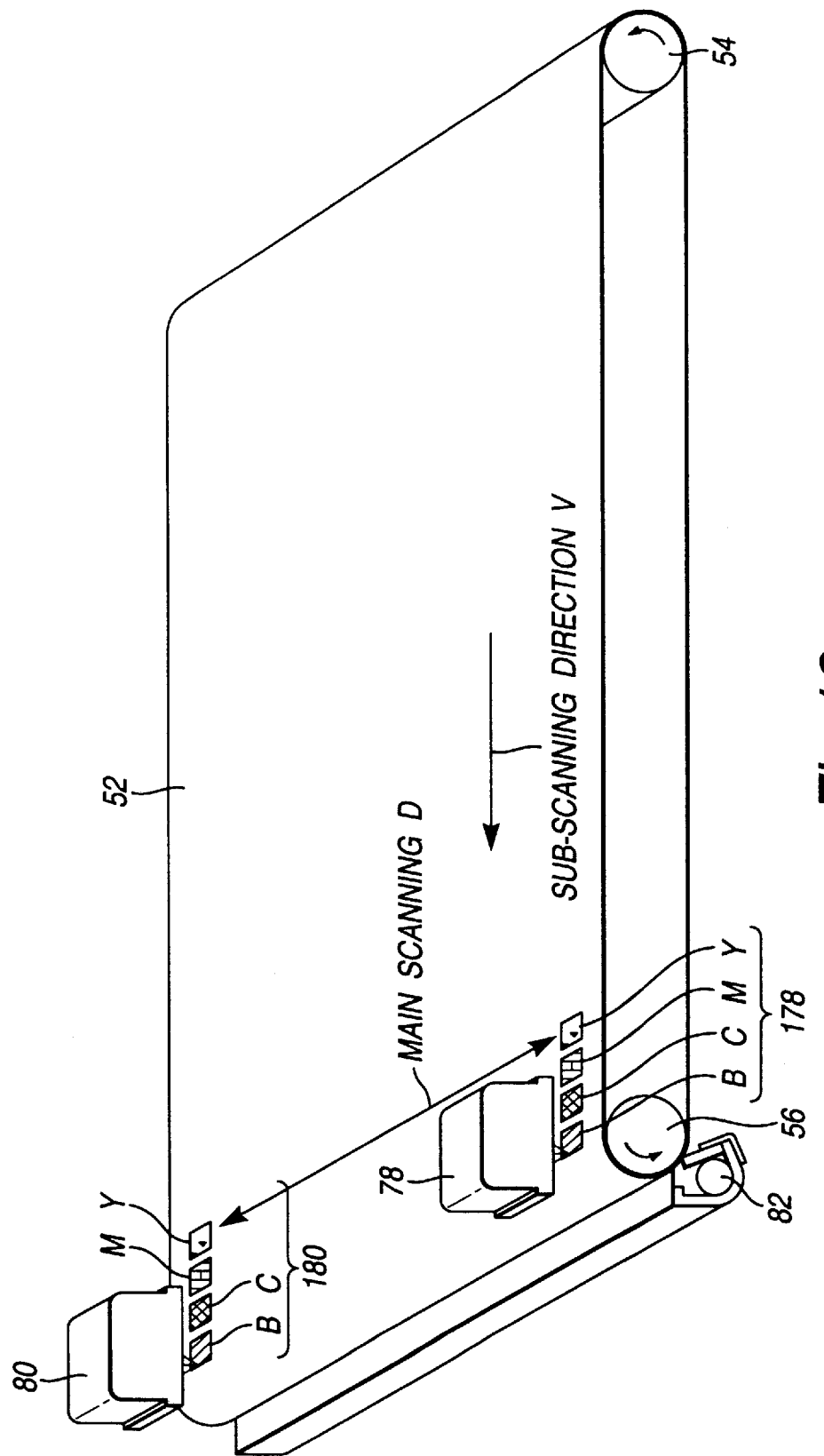
FIG. 12 is a schematic perspective view for explaining the principle of the registration correction in the image forming apparatus shown in FIG. 1.

FIG. 12 is a schematic perspective view of the extracted portion near the conveyor belt of the image forming apparatus shown in FIG. 1. As described in the above, the registration sensors 78 and 80 are arranged at a prescribed distance along the cross direction of the conveyor belt 52, that is, along the main scanning direction H. Further, the line (virtual) connecting the centers of the registration sensors 78 and 80 is defined almost in parallel with the axes of the photosensitive drums 58Y, 58M, 58C and 58B of the image forming units 50Y, 50M, 50C and 50B. It is desirable that the line connecting the centers of the registration sensors 78 and 80 is arranged precisely in parallel with the photosensitive drum 58B of the image forming unit 50B.

Figure 11:
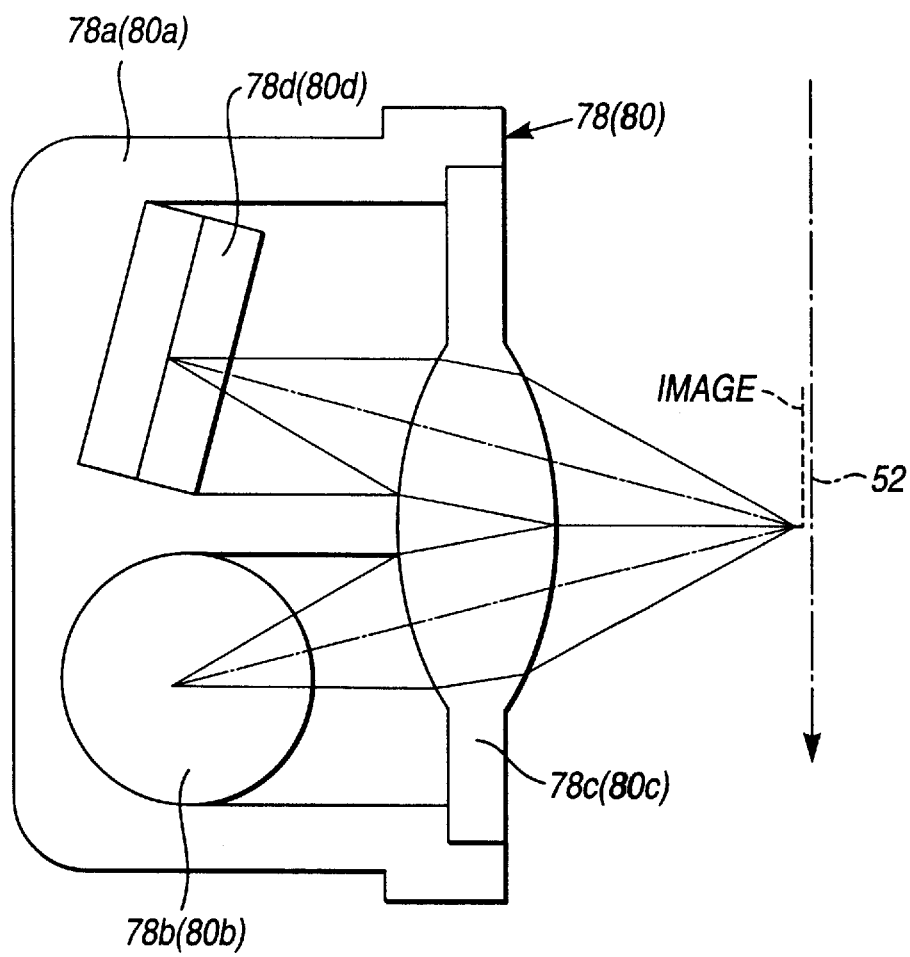
FIG. 11 is a schematic cross-sectional view showing the registration sensor shown in FIG. 10A.

FIG. 11 is a schematic cross-sectional view of the registration sensors 78 and 80 (the registration sensor 78 is shown representatively as the sensors 78 and 80 are substantially the same).

The sensor 78 (80) is composed of a housing 78a (80a), a reference light source 78b (80b), a convex lens 78c (80c) and a photo-sensor 78d (80c).

The reference light source 78b (80b) is arranged at a prescribed position in the housing 78a (80a) and applies a light in a prescribed wavelength including at least wavelength near 450, 500 and 600 mm to an image on the conveyor belt 52.

The convex lens 78c (80c) focuses the light generated from the reference light source 78b (80b) on an image on the conveyor belt 52 and at the same time, focuses the light reflected on the image to form an image on the photo-sensor 78d (80d).

The photo-sensor 78d (80d) senses the light focused on the image by the convex lens 78c (80c) and reflected therefrom and converts it into an electric signal.

Figure 10A:
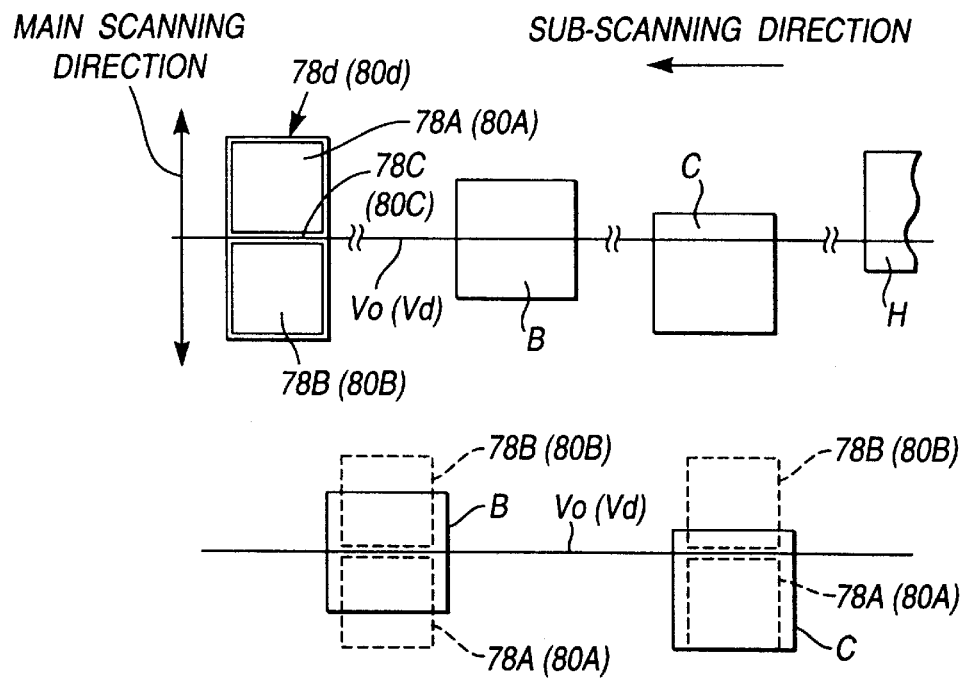
FIG. 10A is a schematic view for explaining a registration correction mode.

As shown in FIG. 10A, the photo-sensor 78d (80d) has a split region PIN diode having a first and a second light detecting regions 78A (80A) and 78B (80B) divided into two along the main scanning direction H orthogonal to the sub-scanning direction V.

Further, the wavelengths of the light used by the light source 78b (80b) are cyan, yellow and magenta toner absorbing spectrum distribution peak wavelengths and secured to maintain the detecting sensitivity of the toners. Further, the lateral magnification of the convex lens 78c (80c) is −1.

Figure 10B:
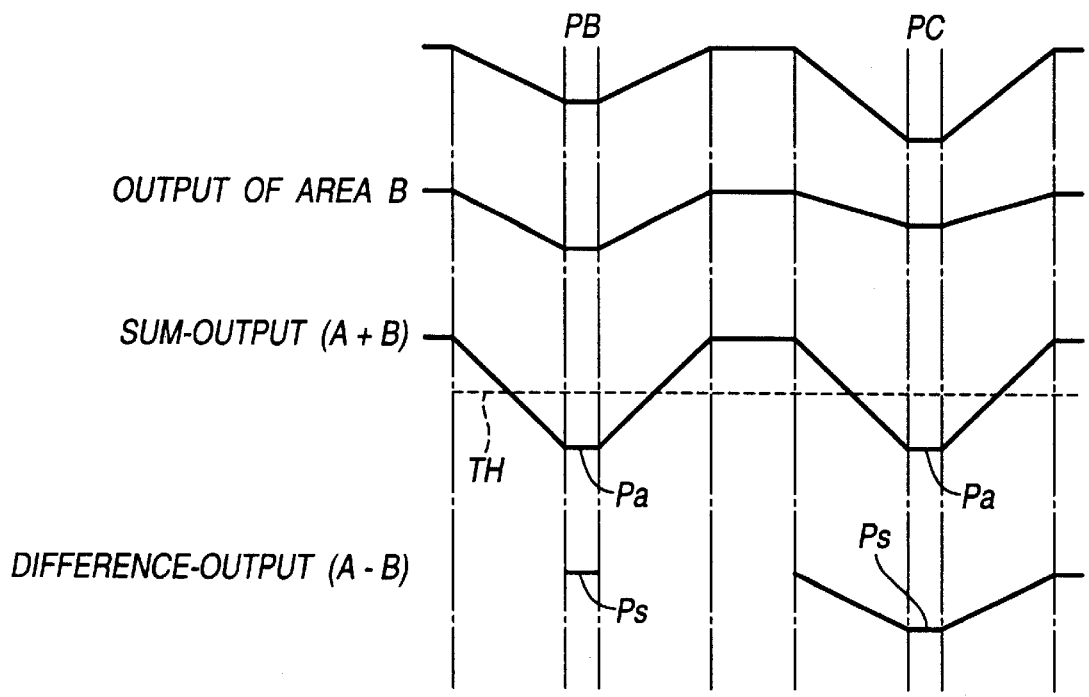
FIG. 10B is a schematic view showing the detected registration output of the registration sensor shown in FIG. 10A.

FIGS. 10A and 10B are diagrams showing the principle of detecting the image position via the registration sensors 78 and 80.

According to FIG. 10A, the photo-sensor 78d of the registration sensor 78 is so arranged that a boundary portion 78C of the first and the second detecting regions 78A and 78B comes in accord with a reference position Vo relative to the main scanning direction of an image formed on the conveyor belt 52. (Similarly, the photo-sensor 80d of the registration sensor 80 is so arranged that the boundary portion 80C of the first and the second detecting regions 80A and 80B comes in accord with the reference position relative to the main scanning direction H of an image formed on the conveyor belt 52.) Further, an image passes through the sensors in order of, for instance, B, C, M and Y (an image Y is omitted). According to FIG. 10B, as the lateral magnification of the convex lens 78c (80c) is −1, output voltages that are output from the PIN diodes 78A (80A) and 78B (80B) are detected by the PIN diode at the side opposite to the direction in which the deviation from an image is caused with the design center Vo (Vd) between as the design center Vo (Vd) in the main scanning direction and the direction of deviation from the image are reversed.

For instance, as an image B is almost linearly symmetrical to the reference position Vo (Vd) of the main scanning direction H, the outputs from the corresponding PIN diodes 78A (80A) and 78B (80B) becomes almost the same. On the other hand, as the image C is shifted to the region B side with the reference position Vo (Vd) in the main scanning direction as the central figure, the outputs from the corresponding PIN diodes 78A (80A) and 78B (80B) become A>B.

Here, by obtaining a sum of the outputs of PIN diodes corresponding to respective images B and C, that is, A+B and a difference, that is, A−B and cutting the exceeding the threshold level TH, it is possible to detect the center of the sub-scanning direction V and that of the main scanning direction H of the images B and C. That is, by detecting a position of the sum of the outputs of the PIN diodes (A+B) exceeding the threshold level TH (for instance, TB and TC), it is possible to detect the center of the sub-scanning direction V of corresponding images and by detecting a value of the level Ps of a difference of the PIN diode outputs (A−B), the center of the main scanning direction H can be detected.

Figure 13:
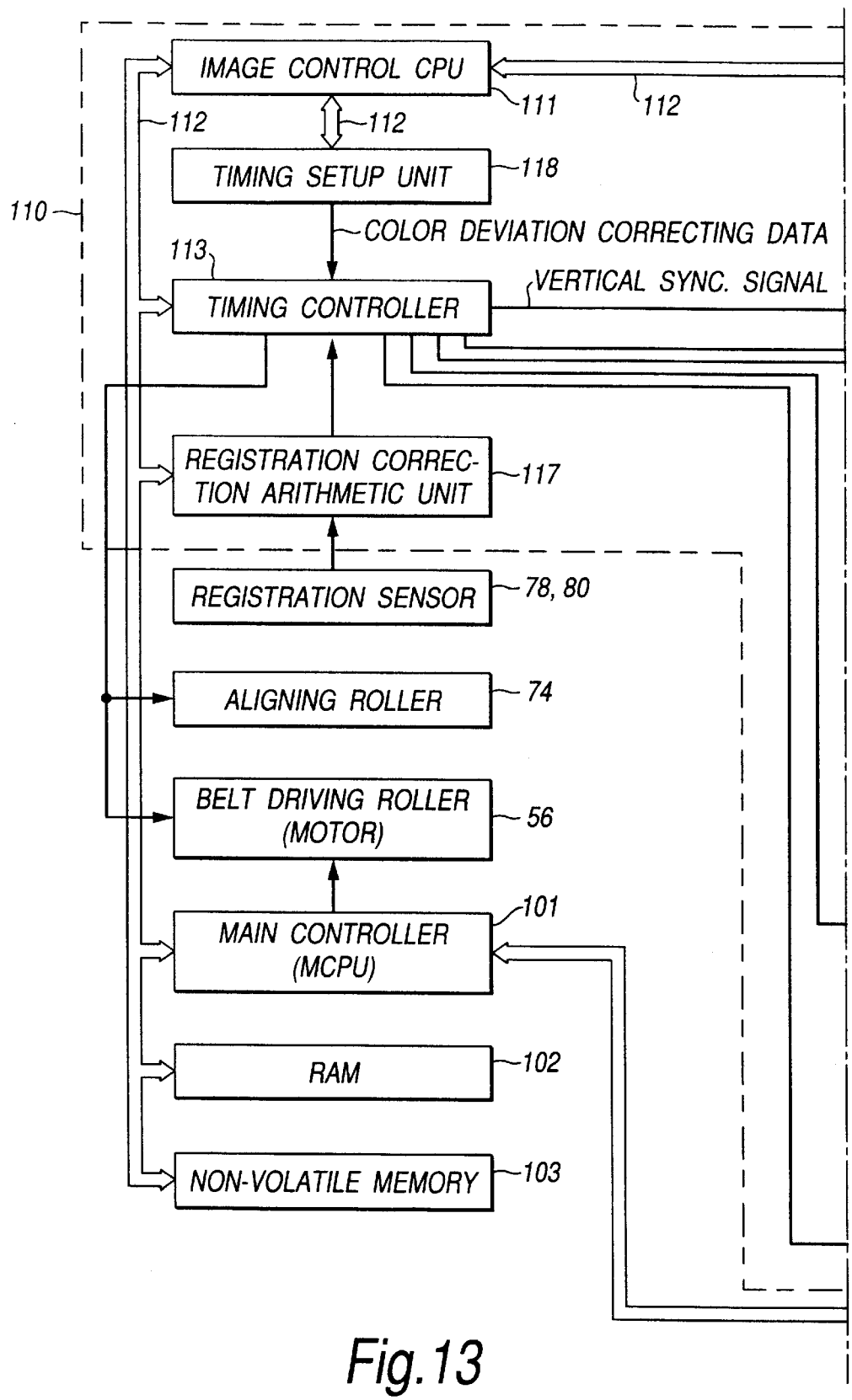
FIG. 13 is a block diagram showing an image control unit of the image forming apparatus shown in FIG. 1.
Figure 13:
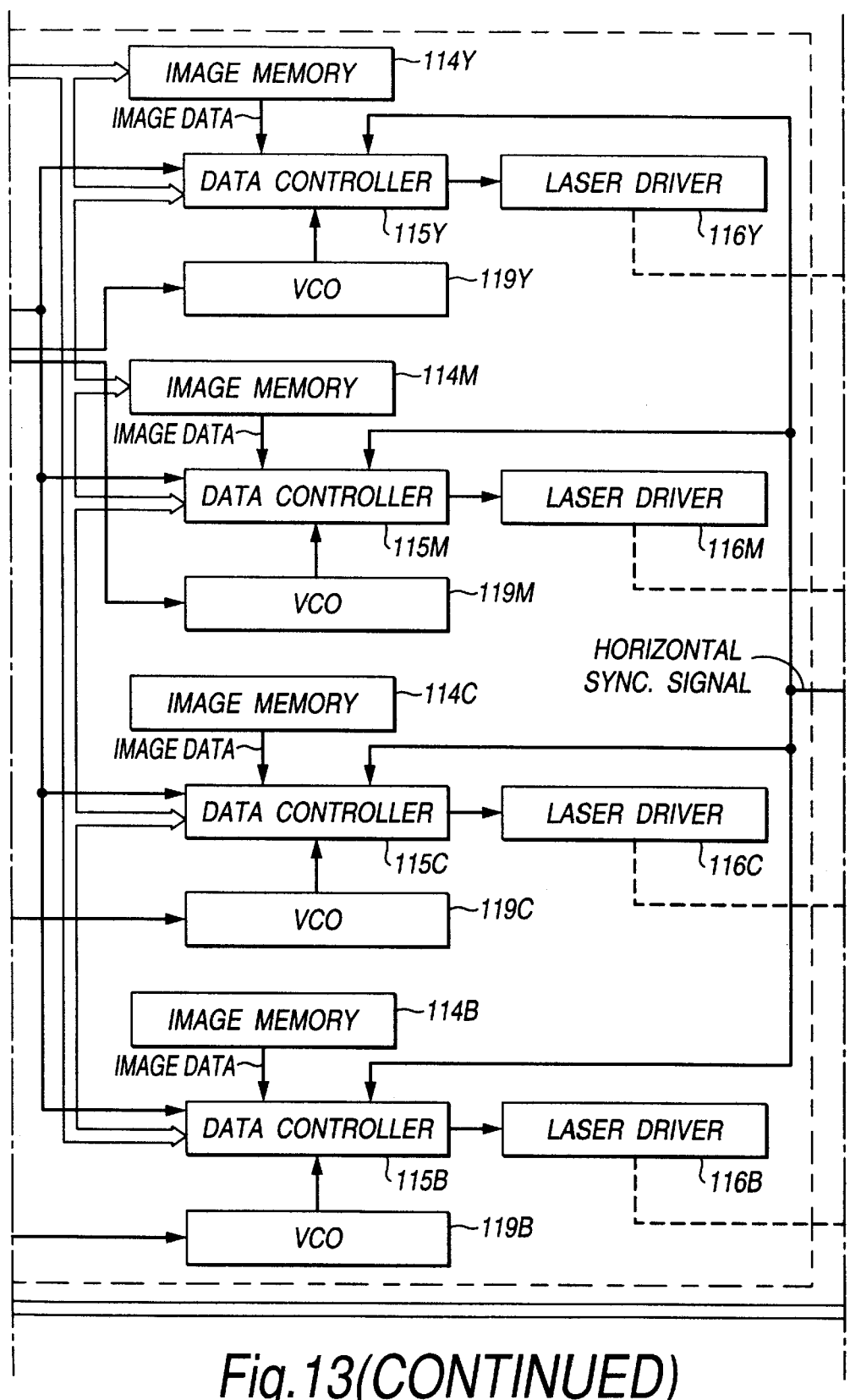
Figure 13:
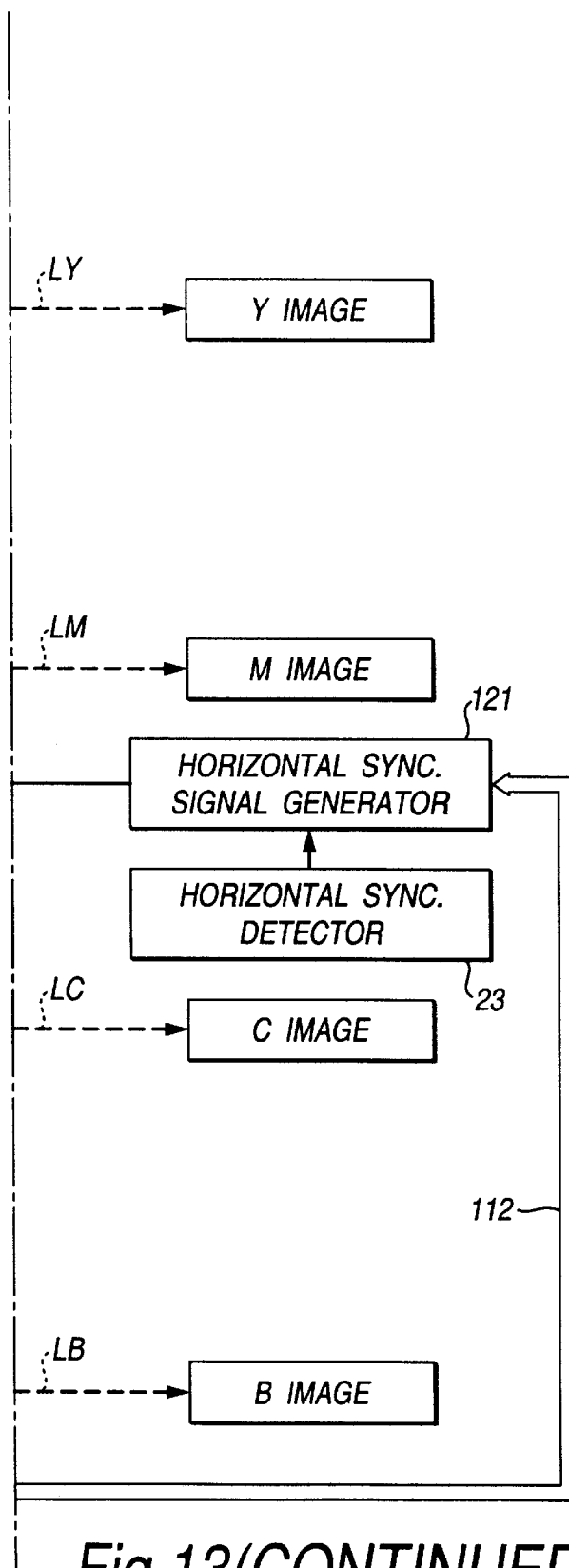

FIG. 13 is a schematic block diagram showing an image controller to control the image forming operation of the image forming apparatus shown in FIG. 1.

An image forming apparatus 100 has an image controller 110.

The image controller 110 contains as an image control CPU 111, a timing controller 113 and a plurality of control units such as data controllers 115Y, 115M, 115C and 115B corresponding to color components. Further, the image control CPU 111, the timing controller 113 and the data controllers 115Y, 115M, 115C and 115B are mutually connected via a bus line 112.

Further, the image control CPU 111 is connected to a main controller 101 which controls mechanical elements of the image forming apparatus 100, for instance, the operation of a motor or rollers and electrical elements, for instance, voltage or current applied to charging units 60Y, 60M, 60C and 60B, developing units 62Y, 62M, 62C and 62B or transferring units 64Y, 64M, 64C and 64B by a bus line 112. Further, the main controller 101 is connected with a ROM (Read Only Memory) (not shown) storing initial data or test patterns and the like to initialize the image forming apparatus 100, a RAM (Random Access Memory) 102 for temporarily storing input image data or correction data that are computed according to the outputs of the registration sensors 78 and 80, a non-volatile memory 103 for storing various correction data obtained in the adjusting mode that is described later and the like.

The timing controller 113 is connected with laser drivers 116Y, 116M, 116C and 116B, a registration correction arithmetic unit 117, a timing setting unit 118 and oscillation frequency variable circuits (voltage controlled oscillators, that is, voltage controlled oscillators, hereinafter referred to as VCOs) 119Y, 119M, 119C and 119B.

The laser driver 116Y, 116M, 116C and 116B energize the corresponding laser devices 3Ya, 3Yb, 3Ma, 3Mb, 3Ca, 3Cb, 3Ba and 3Bb in order to apply laser beams to the photosensitive drums 58Y, 58M, 58C and 58B of the image forming units 50Y, 50M, 50C and 50B based on image data for color components stored in the image memories 114Y, 114M, 114C and 114B and 114Y, 114M, 114C and 114B.

The registration correction arithmetic unit 117 computes a correcting amount of the timing to write an image by the composite laser beams LY, LM, LC and LB based on signals from the registration sensors 78 and 80.

The timing setting unit 118 defines various timings for operating the image forming units 50Y, 50M, 50C and 50B and the lasers 3Ya, 3Yb, 3Ma, 3Mb, 3Ca, 3Cb, 3Ba and 3Bb of the light source 3 of the optical scanner 1 based on the signal from the registration correction arithmetic unit 117.

The VCOs 119Y, 119M, 119C and 119B correct the deviations resulting from solid errors of the image forming units 50Y, 50M, 50C and 50B and a difference in the lengths of the optical paths in the optical scanner 1.

The timing controller 113 is a microprocessor containing a RAM capable of storing correction data in its inside and is integrated in, for instance, a dedicated IC (application specific integrated circuit; hereinafter referred to as ASIC), etc. based on individual specifications.

The data controllers 115Y, 115M, 115C and 115B are microprocessors containing a line memory, a plurality of latch circuits and OR gates and are similarly integrated in ASIC, etc.

The registration correction arithmetic unit 117 is a microprocessor containing at least 4 sets of comparators and OR gates and is similarly integrated in ASIC, etc.

The VCOs 119Y, 119M, 119C and 119B are oscillators that are variable according to voltage under which frequency to be output is applied and have a frequency variable range of about ±3%. For this type of oscillator, a harmonic oscillator, an LC oscillator or a simulated reactance variable LC oscillator is used. Further, for VCOs 119Y, 119M, 119C and 119B, a circuit element with a converter incorporated into one united body to convert an output waveform from a sine wave to a square wave is also known.

Further, in the image memories 114Y, 114M, 114C and 114B, image data from an external memory (not shown) or a host computer are stored. In addition, the output of the horizontal synchronizing detector 23 of the optical scanner 1 is converted into the horizontal synchronizing signal Hsync through a horizontal synchronizing signal generator 121 and input to the data controllers 115Y, 115M, 115C and 115B.

Next, the operation of the image forming apparatus 100 will be described referring to FIG. 1 and FIG. 13. The image forming apparatus 100 is operable in two modes; an image forming (normal) mode to form an image on a paper P conveyed by the conveyor belt 52 and a registration correction (adjusting) mode to form an image directly on the conveyor belt 52.

In the registration correction mode, two sets of paired test images 178 (Y, M, C and B) and 180 (Y, M, C and B) with a prescribed distance are formed in the main scanning direction H orthogonal to the sub-scanning direction V on the conveyor belt 52 as shown in FIG. 12.

A pair of test images 178 (Y, M, C and B) and 180 (Y, M, C and B) are formed corresponding to registration adjusting image data pre-stored in a ROM. The test images 178 and 180 are moved along the sub-scanning direction V with the movement of the conveyor belt 52 and pass through the registration sensors 78 and 80. As a result, a deviation generated between the test images 178 and 180 and the registration sensor 78 and 80 is detected. Further, in the registration correction mode, the paper feed out roller 72 to feed a paper P from the cassette 70 and the fixing unit 84 are kept stopped.

In detail, under the control of the main controller 101, the first through the fourth image forming units 50Y, 50M, 50C and 50B are energized and prescribed potential is applied to the surfaces of the photosensitive drums 58Y, 58M, 58C and 58B of the image forming units 50Y, 50M, 50C and 50B. At the same time, under the control of the image control CPU 111 of the image controller 110, the polygon mirror 5a of the optical deflector 5 of the optical scanner 1 is rotated at a prescribed speed.

In succession, under the control of the image control CPU 111, image data corresponding to test data taken from the ROM are taken into the image memories 114Y, 114M, 114C and 114B. Thereafter, based on the timing data set by a timing setting unit 118 and registration correction data stored in an internal RAM in a timing controller 113 (in this case, if no registration correction data are stored in the internal RAM, initial data stored in the ROM are used), a vertical synchronizing signal Vsync is output from the timing controller 113.

The vertical synchronizing signal Vsync generated by the timing controller 113 is supplied to the data controllers 115Y, 115M, 115C and 115B and VCOs 119Y, 119M, 119C and 119B.

The data controllers 115Y, 115M, 115C and 115B operate the corresponding lasers 3Ya, 3Yb, 3Ma, 3Mb, 3Ca, 3Cb, 3Ba and 3Bb of the light source 3 of the optical scanner 1 based on the vertical synchronizing signal Vsync. The laser beams LY, LM, LC and LB emitted from the lasers 3Ya, 3Ma, 3Ca and 3Ba and 3Yb, 3Mb, 3Cb and 3Bb of the light source 3 are detected by the horizontal synchronizing detector 23. Then, the horizontal synchronizing signal Hsync is output from a horizontal synchronizing signal generator 121. After this horizontal synchronizing signal Hsync is output, prescribed clocks are counted (until the outputs from the registration sensors 78 and 80 are input, initial data stored in the ROM are used), image data stored in the image memories 114Y, 114M, 114C and 114B are output at prescribed timings.

At this time, oscillation frequency data which are initial data stored in the ROM are supplied to the data controllers 115Y, 115M, 115C and 115B from the VCOs 119Y, 119M, 119C and 119B.

In succession, under the control of the data controllers 115Y, 115M, 115C and 115B, laser driving signals corresponding to image data are output to the lasers 3Ya, 3Ma, 3Ca and 3Ba and 3Yb, 3Mb, 3Cb and 3Bb of the light source 3 from the laser drivers 116Y, 116M, 116C and 116B, and intensity modulated laser beams LYa, LYb, LMa, LMb, LCa, LCb, LBa and LBb are output based on image data.

Thus, electrostatic latent images corresponding to test image data are formed on the photosensitive drums 58Y, 58M, 58C and 58B corresponded to prescribed potential in advance, respectively. These electrostatic latent images are developed by toners in corresponding colors by the developing units 62Y, 62M, 62C and 62B and converted into a four colored test toner image (two sets).

Two sets of test toner images formed on the photosensitive drums 58Y, 58M, 58C and 58B are transferred directly to the conveyor belt 52 by the transferring units 64Y, 64M, 64C and 64B and conveyed toward the registration sensors 78 and 80.

When two sets of the test toner images pass through the registration sensors 78 and 80, prescribed outputs corresponding to a relative position of respective test toner images to the positions of the registration sensors 78 and 80, that is, a deviation of the test toner images are output from the registration sensors 78 and 80.

The outputs from the registration sensors 78 and 80 are input to a registration correction arithmetic unit 117 and used in the computation of a deviation of each test toner image.

The registration correction arithmetic unit 117 detects a positional deviation in the sub-scanning direction of paired test toner images in each color formed separately in a prescribed distance in the sub-scanning direction, that is, 178Y and 180Y, 178M and 180M, 178C and 180C, and 178B and 180B, and computes a mean value. From deviations between this mean value and pre-designed values, a timing correction value Vr to output the vertical synchronizing signal Vsync is defined. Thus, the emitting timings of the laser devices 3Ya 3Yb, 3Ma, 3Mb, 3Ca, 3Cb, 3Ba and 3Bb of the optical scanner 1, that is, a deviation in the sub-scanning direction between the distance in the arranged image forming units 50Y, 50M, 50C and 50B and the mutual distance in the sub-scanning direction depending on the mutual distance in the sub-scanning direction of the first through the fourth composite laser beams LY, LM, LC and LB emitted from the optical scanner 1 is aligned each other.

Further, registration correction arithmetic unit 117 computes a mean value after detecting positional deviations in the main scanning direction of one set of the test toner images, for instance, 178Y, 178M, 178C and 178B. The timing correcting amount Hr to output image data after outputting the horizontal synchronizing signal Hsync from a deviation between the mean value thus obtained and a pre-determined design value. Thus, the timing to modulate the intensity of the laser beams LY, LM, LC and LB emitted from the lasers 3Y, 3M, 3C and 3B of the light source 3 of the optical scanner 1 according to image data, that is, the starting positions to write image data in the main scanning direction to be recorded on the photosensitive drums 58Y, 58M, 58C and 58B are aligned.

The registration correction arithmetic unit 117 further detects the positional deviations in the main scanning direction for paired test images, that is, 178Y and 180Y, 178M and 180M, 178C and 180C, and 178B and 180B and then, computes a mean value. By obtaining a quantity of deviation between this computed mean value and a pre-determined design value, based on this quantity of deviation, a correcting quantity Fr of oscillation frequency to be output from the VCos 119Y, 119M, 119C and 119B is defined. Thus, the length in the main scanning direction per clock of the laser beams emitted to the photosensitive drums 58Y, 58M, 58C and 58B from the lasers 3Y, 3M, 3C and 3B of the light source 3 of the optical scanner 1, that is, the length of one line in the main scanning direction to be formed in an image on the photosensitive drums 58Y, 58M, 58C and 58B is aligned.

Further, the correction quantities Vr, Hr and Fr obtained by the registration correction arithmetic unit 117 are stored temporarily in the RAM in the timing controller 113. In this case, the correction quantities Vr, Hr and Fr may be stored in the non-volatile RAM 103. Further, these correcting operations are executed at a pre-determined timing when the selection of the correction mode is instructed through the control panel (not shown), the power switch (not shown) of the image forming apparatus 100 is turned ON or the number of print sheets counted by a counter (not shown) reached a prescribed number of sheets.

Further, the test toner images on the conveyor belt 52 used in the adjusting mode are further conveyed with the rotation of the conveyor belt 52 and removed by the belt cleaner 82.

Next, the image forming (normal) mode will be described.

When an image forming start signal is supplied from the operation panel (not shown) or a host computer, the image forming units 50Y, 50M, 50C and 50B are warmed up under the control of the main controller 101 and the polygon mirror 5a of the optical deflector 5 of the optical scanner 1 is rotated at a prescribed rotating speed under the control of the image control CPU 111.

In succession, under the control of the main controller 101, image data to be printed are taken into the RAM 102 from an external memory or a host computer or a scanner. Part (or all) of the image data taken into the RAM 102 is stored in the image memories 114Y, 114M, 114C and 114B under the control of the image control CPU 111 of the image controller 110.

Further, under the control of the main controller 101, the feed out roller 72 is energized at a prescribed timing, for instance, based on the vertical synchronizing signal Vsync output from the timing controller 113 and a sheet of paper P is taken out from the paper cassette 70. When aligned with the timing of toner images of Y, M, C and B supplied by the image forming operations of the image forming units 50Y, 50M, 50C and 50B by the aligning roller 74, this taken out paper P is fitted on the conveyor belt 52 by the adsorbing roller 74 and guided to the image forming units 50 with the rotation of the conveyor belt 52.

On the other hand, in parallel with or simultaneously with the feeding and conveying operations of paper P, the vertical synchronizing signal Vsync is output from the timing controller 113 based on data set by a timing setting unit 118 and registration data and clock data read out of the internal RAM of the timing controller 113.

When the vertical synchronizing signal Vsync is output from the timing controller 113, the laser drivers 116Y, 116M, 116C and 116B are energized by the data controllers 115Y, 115M, 115C and 115B, respectively. When the laser drivers 116Y, 116M, 116C and 116B are energized, the laser beam for one line in the main scanning direction is applied to each of the photosensitive drums 58Y, 58M, 58C and 58B from the lasers 3Ya, 3Ma, 3Ca and 3Ba, 3Yb, 3Mb, 3Cb and 3Bb of the light source 3, respectively.

Immediately after the horizontal synchronizing signal Hsync generated from the horizontal synchronizing signal generator 121 is input based on this laser beam for one line, the number of clocks of the VCOs 119Y, 119M, 119C and 119B are counted. When the number of clocks counted of the VCOs 119Y, 119M, 119C and 119B reached a prescribed value, image data to be printed are read out of the image memories 114Y, 114M, 114C and 114B, respectively.

In succession, under the control of the data controllers 115Y, 115M, 115C and 115B, in order to change intensity of the laser beams LY, LM, LC and LB emitted from the light sources 3, image data are transferred to the laser drivers 116Y, 116M, 116C and 116B, respectively and images without deviation are formed on the photosensitive drums 58Y, 58M, 58C and 58B, respectively.

As a result, the laser beams LY, LM, LC and LB guided to the photosensitive drums 58Y, 58M, 58C and 58B are focused to form images accurately on the photosensitive drums 58Y, 58M, 58C and 58B without subject to deviations in the optical paths between the lasers 3Y, 3M, 3C and 3B of the light sources 3 and the photosensitive drums 58Y, 58M, 58C and 58B or the effect of fluctuation in beam spot diameters on the image surfaces attributable to the deviations in diameters of the photosensitive drums 58Y, 58M, 58C and 58B.

The first through the fourth laser beams LY, LM, LC and LB focused to form images on respective photosensitive drums 58Y, 58M, 58C and 58B form electrostatic latent images corresponding to image data on the photosensitive drums 58Y, 58M, 58C and 58B, respectively when potentials charged at the prescribed level on the photosensitive drums are changed based on image data.

These electrostatic latent images are developed by toners in corresponding colors and then, converted into toner images. these toner images are moved to a paper P being conveyed by the conveyor belt 52 with the rotation of the photosensitive drums 58Y, 58M, 58C and 58B and transferred on the paper P on the conveyor belt 52 at a pre-determined timing by the transferring unit 64.

Thus, toner images in four colors mutually superposed accurately on the paper P are formed on the paper P. Further, residual toners left on the photosensitive drums 58Y, 58M, 58C and 58B after the toner images are transferred on the paper P are removed by the cleaners 66Y, 66M, 66C and 66B. Further, residual potentials left on the photosensitive drums 58Y, 58M, 58C and 58B are discharged by the discharging lamps 68Y, 68M, 68C and 68B and used in the successive image forming.

The paper P holding a four colored toner image electrostatically is further conveyed with the rotation of the conveyor belt 52, separated from the conveyor belt 52 by the difference between the curvature of the belt driving roller 56 and the straightforward movability of the paper P and guided to the fixing unit 84. The toners on the paper P guided to the fixing unit 84 are fused and a toner image is fixed as a color image. Then, the paper P is ejected on the paper receiving tray.

On the other hand, after supplying the paper P, the conveyor belt 52 is continuously rotated and undesired toners left on the surface are removed by the belt cleaner 82, and again used for conveying a paper P supplied from the cassette 70.

As described above, according to the optical scanner of the present invention, the second f θ lens to emit laser beams to the second and the third mirrors which fold 4 laser beams close to the sub-scanning direction at the prescribed position and guide them to the photosensitive drums corresponding to respective laser beams is held by the holding member positioned in the direction away from the second and the third mirrors with regard to the sub-scanning direction so as not to contact the second and the third mirrors. Thus, a distance in the sub-scanning direction between the second and the third mirrors and the second f θ lens, that is, the thickness of the optical scanner is reduced.

From the above, if a size of an image forming apparatus remains unchanged, capacities of toner hoppers of developing units arranged close to an optical scanner can be increased. Thus, even when a monochrome image in black toner is formed more frequently than the colored image formation, the number of black toner supplies can be reduced.

What is claimed is:

1. An image forming apparatus comprising:

an image forming unit having an image carrier, means for charging the image carrier, and means for developing an electrostatic latent image formed on the charged image carrier;

means having a plurality of reflecting surfaces for deflecting laser beams emitted from light sources;

an f θ lens through which the laser beams pass for correcting fluctuation of the laser beams caused by the plural uneven reflecting surfaces of the deflecting means;

first reflecting means, provided at a first side to the optical axis of the f θ lens, for reflecting the laser beams passed through the f θ lens;

second reflecting means, provided at a second side opposite to the first side to the optical axis of the f θ lens, for reflecting the laser beams reflected by the first reflecting means to lead the laser beams onto the image carrier of the image forming unit arranged at the second side to the optical axis of the f θ lens so as to form an electrostatic latent image on the image carrier which is charged by the charging means;

means, provided at the first side to the optical axis, for holding the f θ lens; and means, provided at a position closer to the optical axis of the f θ lens than the second reflecting means at the second side and provided between the optical axis and the image forming unit, for pressing the f θ lens against the holding means.

2. An image forming apparatus claimed in claim 1, wherein the holding means has a prescribed thickness and the pressing means has a thickness thinner than that of the holding means.

3. An image forming apparatus claimed in claim 2, wherein the pressing means includes a highly rigid blade spring.

4. An image forming apparatus comprising:

an image forming unit having at least a first and a second image carrier, first and second charging means for charging the first and second image carriers, and first and second developing means for developing an electrostatic latent image formed on the first image carrier and an electrostatic latent image formed on the second image carrier;

means having a plurality of reflecting surfaces for deflecting a first and a second laser beam emitted from a first and a second light source;

an f θ lens through which the first and second laser beams pass for correcting fluctuation of the laser beams caused by the plural uneven reflecting surfaces of the deflecting means;

first reflecting means, provided at a first side to the optical axis of the f θ lens, for reflecting the first laser beam passed through the f θ lens;

second reflecting means, provided at a second side opposite to the first side to the optical axis of the f θ lens, for reflecting the first laser beam reflected by the first reflecting means to lead the first laser beam onto the first image carrier of the image forming unit arranged at the second side to the optical axis of the f θ lens so as to form an electrostatic latent image on the first image carrier which is charged by the first charging means;

third reflecting means, provided at the first side to the optical axis of the f θ lens and at a position far away from a distance between the first reflecting means and the f θ lens, for reflecting the second laser beam passed through the f θ lens;

fourth reflecting means, provided at the second side, for reflecting the second laser beam reflected by the third reflecting means, crossing the first laser beam reflected by the first reflecting means and in the way led to the second reflecting means, and leading the second laser beam onto the second image carrier of the image forming unit arranged at the second side to the optical axis of the f θ lens so as to form an electrostatic latent image on the second image carrier which is charged by the second charging means;

means, provided at the first side to the optical axis, for holding the f θ lens; and means, provided at a position closer to the optical axis of the f θ lens than the second reflecting means at the second side and provided between the optical axis and the image forming unit, for pressing the f θ lens against the holding means.

5. An image forming apparatus claimed in claim 4, wherein the holding means has a prescribed thickness and the pressing means has a thickness thinner than that of the holding means.

6. An image forming apparatus claimed in claim 5, wherein the pressing means includes a highly rigid blade spring.

* * * * *